United States Patent [19]

Nakajima

[11] Patent Number: 5,530,560
[45] Date of Patent: Jun. 25, 1996

[54] IMAGE FORMING APPARATUS WHEREIN IMAGES ARE FORMED ON FRONT AND BACK FACES OF A PAPER SUCH THAT THEY CAN BE OBSERVED IN A NORMAL ORIENTATION

[75] Inventor: Akio Nakajima, Toyokawa, Japan

[73] Assignee: Minolta Co., Ltd., Osaka, Japan

[21] Appl. No.: 358,512

[22] Filed: Dec. 19, 1994

[30] Foreign Application Priority Data

Mar. 4, 1994 [JP] Japan ................... 6-034597

[51] Int. Cl.⁶ ................................... H04N 1/387
[52] U.S. Cl. ................ 358/453; 358/450; 358/452
[58] Field of Search .................... 358/450–453; 382/284, 289–290, 294, 296–297; 355/218, 319, 320; H04N 1/387

[56] References Cited

U.S. PATENT DOCUMENTS

| | | | |
|---|---|---|---|
| 4,591,884 | 5/1986 | Miyamoto et al. | 346/153.1 |
| 4,745,441 | 5/1988 | Maruta et al. | 355/218 |
| 4,825,250 | 4/1989 | Miyata et al. | 358/450 |
| 4,941,017 | 7/1990 | Mishima et al. | 355/218 |
| 5,105,230 | 4/1992 | Emori | 355/319 |

FOREIGN PATENT DOCUMENTS 1-220970  9/1989  Japan.
3-233578  10/1991  Japan.

*Primary Examiner*—Kim Yen Vu
*Attorney, Agent, or Firm*—Willian Brinks Hofer Gilson & Lione

[57] ABSTRACT

In an image forming apparatus having a two-face copy mode wherein document images are formed on front and back faces of a paper, a direction of an image such as portrait or landscape in a document is set by a user or according to a document size, while a first margin is also set by a size or a document size for a document image on the front face in a reproduced image on a paper. A second margin for another document image on the back face is determined at a position opposite to the first margin. An image memory stores the digital image data. A rotation angle is set according to the document direction and the margin position, so that normal images can be observed in the front and back faces of a paper if the paper is turned over by fixing it at the margin. Then, the digital image data read from said image memory is rotated by the rotation angle. Then, the digital image data is printed on the front and back faces of a paper. If a 2-in-1 copy mode is provided, the rotation angle is determined similarly except the setting or document direction which is set opposite to that of documents for a synthesized image of two document images.

18 Claims, 30 Drawing Sheets

Fig. 4 PRIOR ART
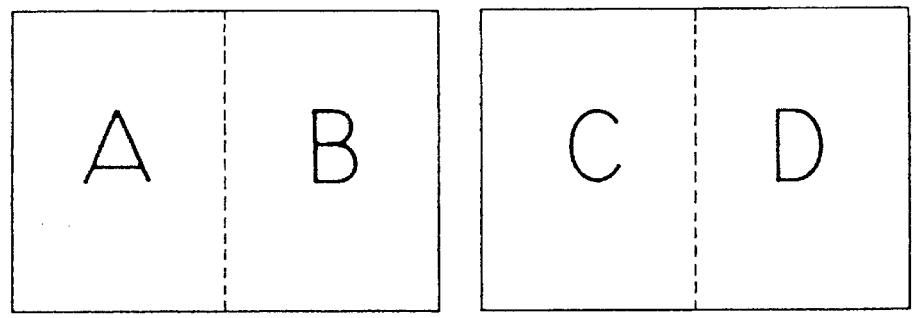
Fig. 5A PRIOR ART
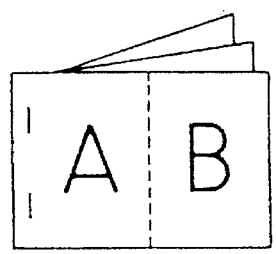
Fig. 5B PRIOR ART
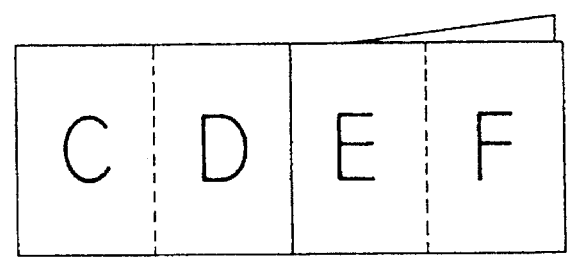
Fig. 6A PRIOR ART       Fig. 6B PRIOR ART
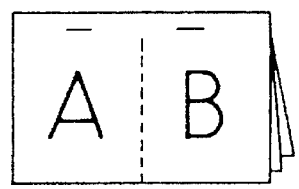
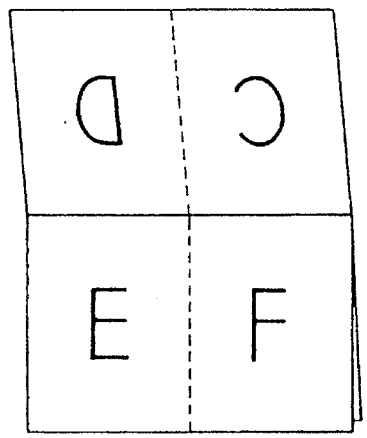

Fig. 7

Fig. 14A    Portrait , Lateral
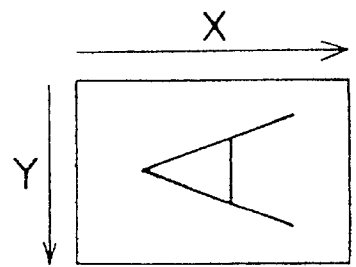
Fig. 14B    Portrait , Longitudinal
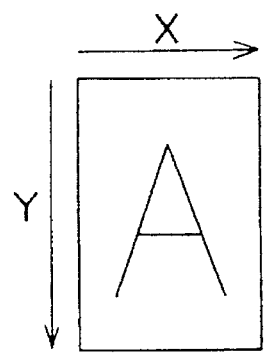
Fig. 14C    Landscape , Lateral
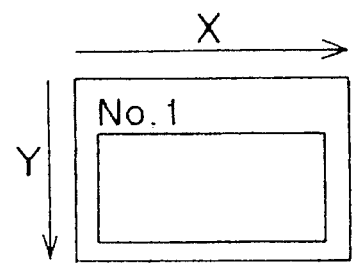
Fig. 14D    Landscape , Longitudinal
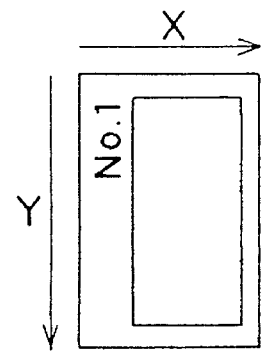

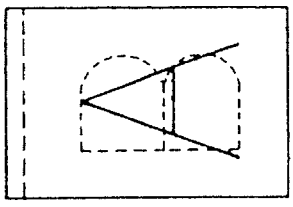
Fig. 15B  Portrait, Top margin
Single-face copy / Two-face copy
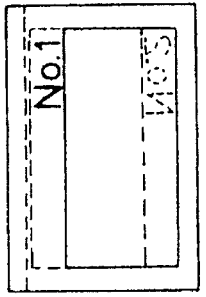
Fig. 15D  Landscape, Top margin
Single-face copy / Two-face copy
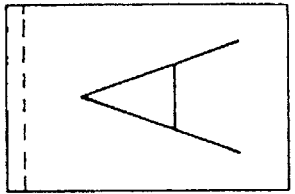
Fig. 15A  Portrait, Left margin
Single-face copy / Two-face copy
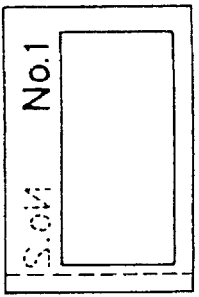
Fig. 15C  Landscape, Left margin
Single-face copy / Two-face copy
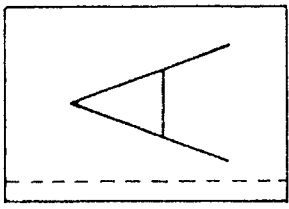
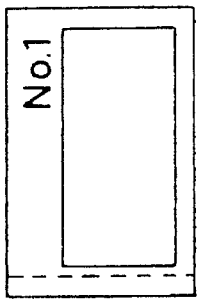

Fig. 16  Portrait, Lateral, Left margin
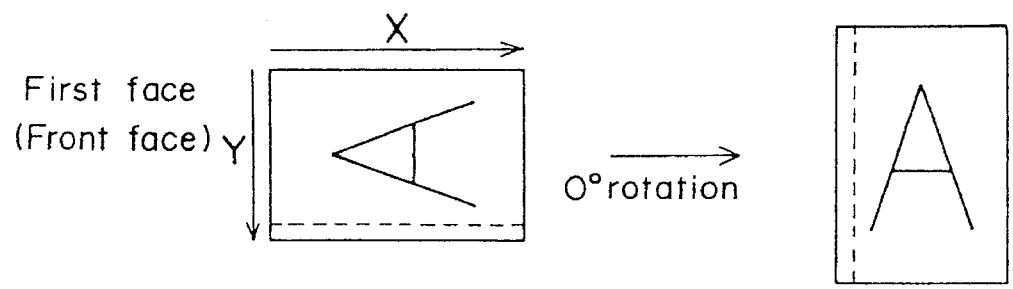
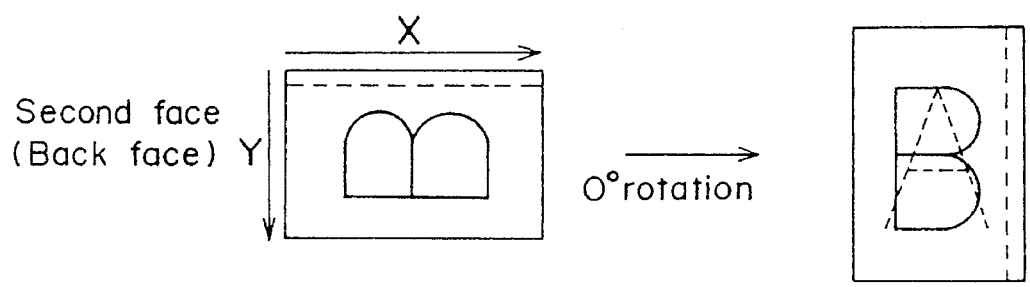
Fig. 17
Portrait, Lateral, Top margin
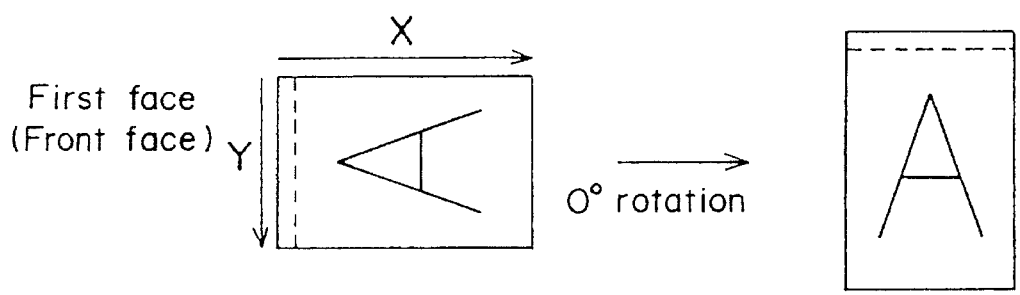
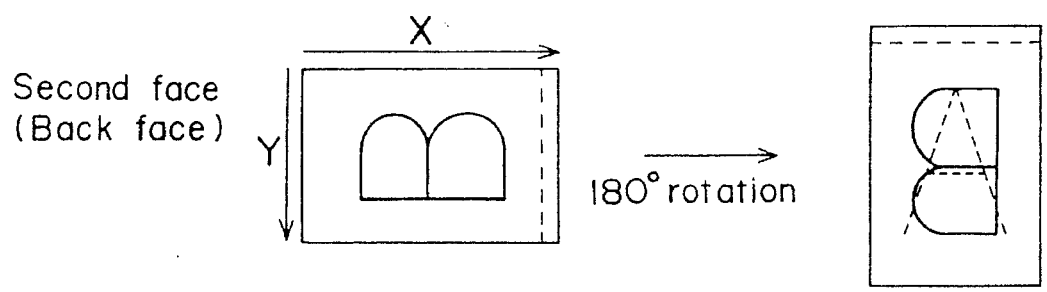

Landscape, Lateral, Left margin

Landscape, Lateral, Top margin

IMAGE FORMING APPARATUS WHEREIN IMAGES ARE FORMED ON FRONT AND BACK FACES OF A PAPER SUCH THAT THEY CAN BE OBSERVED IN A NORMAL ORIENTATION

BACKGROUND OF THE INVENTION

1. Field of the Invention

The present invention relates to an image forming apparatus, or, in detail, to an image forming apparatus such as a digital copying machine which can store image information.

2. Description of the Prior Art

In a digital copying machine, a document image is read by a sensor and is stored in a memory. Then, the image data stored in the memory can be processed in various ways. For example, a plurality of the same document image can be reproduced by reading the image data iteratively. It is possible to scale up and down the document image by processing the image data. It is also possible to rotate the document image. A digital copying machine is also known to form document images on front and back faces of a paper in a two-face copy mode. It is also known that a margin can be set when a document image is reproduced. It is also proposed that a plurality of pages of document images are reproduced in a paper by using image data stored in a memory.

However, if a digital copying machine has these various modes in combination, many problems have to be solved. For example, when document images are formed on two faces of a paper, a direction of the two images are set usually to be the same. However, the same direction is not always appropriate. For example, as shown in FIG. 1, four documents having characters "A", "B", "C" and "D" along longitudinal directions thereof are stacked in an automatic document feeder. Then, document images are reproduced on two faces of paper successively so that a direction of the two images are set to be the same. Thus, the two document images having characters "A" and "B" are formed on front and back faces of a paper, while the two document images having characters "C" and "D" are formed on front and back faces of another paper. In a case shown in FIG. 2A, the two papers are bound at the left side. In this case, as shown in FIG. 2B, when the papers are turned over, a reader observes normal images "B" and "C". In another case shown in FIG. 3A, the two papers are bound at the top side. In this case, as shown in FIG. 3B, when the papers are turned over, a reader observes a normal image "B" and an abnormal "C". In the image of "B", top and bottom are reversed and right and left are also reversed.

The documents shown in FIG. 1 are portrait documents where images are formed in longitudinal documents. A portrait document denotes a document which has an image longer along the longitudinal direction. As shown in FIG. 4, if these portrait documents are reproduced in a 2-in-1 mode and in two-face mode, two images are formed as shown in FIG. 5A. That is, document images including "A" and "B" are formed side by side on a front page, while document images including "A" and "B" are formed side by side on a back page. In a case shown in FIG. 5A, papers are bound at the left side. In this case, as shown in FIG. 5B, when the papers are turned over, a reader observes normal images "C", "D" and the like. In another case shown in FIG. 6A, papers are bound at the top side. In this case, as shown in FIG. 6B, when the papers are turned over, a reader observes abnormal images of "C" and "D" where top and bottom are reversed and right and left are also reversed.

If a digital copying machine has modes such as two-face mode, 2-in-1 mode, scale up and down mode, rotation mode and margin mode in combination, similar problems have to be solved. Therefore, it is desirable that the direction of document image can be changed appropriately in two face copy mode.

SUMMARY OF THE INVENTION

An object of the present invention is to provide a an image forming apparatus having a two-face mode wherein normal images and reverse images can be formed on papers appropriately so that a user can see normal images when papers are turned over.

In an image forming apparatus having a two-face copy mode wherein document images are formed on front and back faces of a paper, a direction of an image such as portrait or landscape in a document is set by a user or according to a document size, while a first margin is also set by a size or a document size for a document image on the front face in a reproduced image on a paper. A second margin for another document image on the back face is determined at a position opposite to the first margin. An image memory stores the digital image data. A rotation angle is set according to the document direction and the margin position, so that normal images can be observed in the front and back faces of a paper if the paper is turned over by fixing it at the margin. Then, the digital image data read from said image memory is rotated by the rotation angle. Then, the digital image data is printed on the front and back faces of a paper.

If a 2-in-1 copy mode is provided further wherein two document images are formed on a same face of a paper, a synthesized image of two document images is stored in the image memory. A document direction and a first margin are set similarly. It is to be noted that the document direction is changed to a different direction perpendicular to that set as mentioned previously. A rotation angle is also determined similarly, and images are formed by using the rotation angle.

The rotation angle is same for front and back faces of a paper when the document is a portrait document and the position of the margin is set at a top end of the paper or when the document is a landscape document and the position of a margin is set at a left end of the paper. On the other hand, rotation angles are different by 180° for front and back faces of a paper when the document is a portrait document and the position of a margin is set at a left end of the paper or when the document is a landscape document and the position of a margin is set at a top end of the paper.

An advantage of the present invention of an image forming apparatus having two-face copy mode is that images on papers reproduced in two-face copy mode can always be seen by a user as normal images.

Another advantage of the present invention of an image forming apparatus having two-face copy mode and 2-in-1 mode is that if images on papers reproduced in two-face copy mode can always be seen by a user as normal images without considering the directions of documents set by a user on a document feeder.

BRIEF DESCRIPTION OF THE DRAWINGS

These and other objects and features of the present invention will become clear from the following description taken in conjunction with the preferred embodiments thereof with reference to the accompanying drawings, and in which:

FIG. 4 is a plan view of front and back faces of four documents printed in a 2-in-1 mode;

FIG. 5A is a perspective view of copy papers folded along the lateral direction of the copy papers, and FIG. 5B is a perspective view of the papers shown in FIG. 5A in a state when they are turned;

FIG. 6A is a perspective view of copy papers folded along the longitudinal direction of the copy papers, and FIG. 6B is a perspective view of the papers shown in FIG. 6A in a state when they are turned;

FIG. 7 is a sectional view of a copying machine of an embodiment of the invention;

FIG. 14A is a diagram of image data of portrait document fed along a lateral direction thereof, FIG. 14B is a diagram of image data of portrait document fed along a longitudinal direction thereof, FIG. 14C is a diagram of image data of landscape document fed along a lateral direction thereof, and FIG. 14D is a diagram of image data of landscape document fed along a longitudinal direction thereof;

FIG. 15A is a diagram of output images on papers of portrait documents with a left margin, FIG. 15B is a diagram of output images on papers of portrait documents with a top margin, FIG. 15C is a diagram of output images on papers of landscape documents with a left margin, and FIG. 15D is a diagram of output images on papers of landscape documents with a top margin;

FIG. 16 is a diagram for illustrating portrait documents fed along a lateral direction thereof and output images thereof on papers with a left margin;

FIG. 17 is a diagram for illustrating portrait documents fed along a lateral direction thereof and output images thereof on papers with a top margin;

DETAILED DESCRIPTION OF THE PREFERRED EMBODIMENTS

Figure 1:
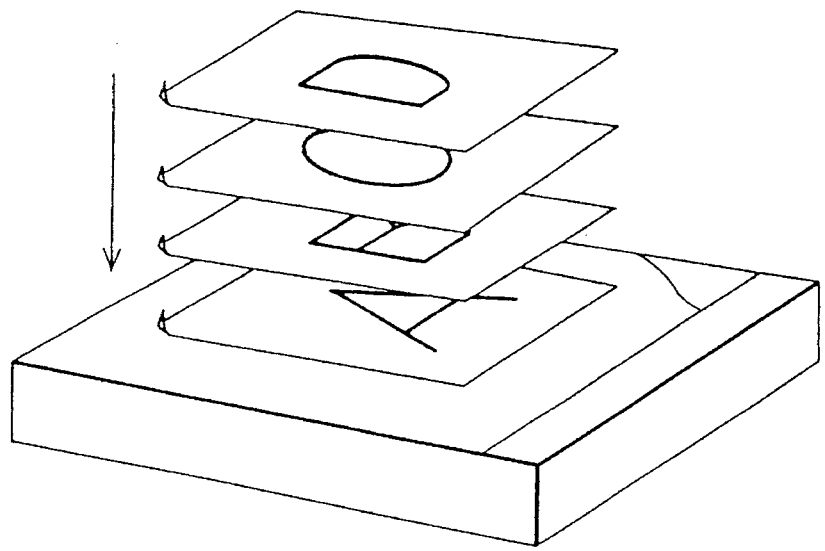
FIG. 1 is a diagram of four document loaded in a document tray.
Figure 2A:
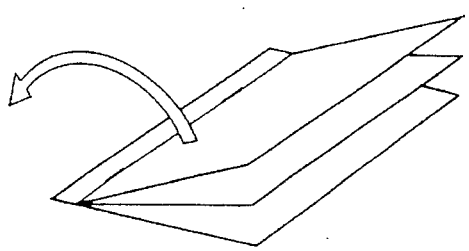
FIG. 2A is a perspective view of copy papers folded along the longitudinal direction of the copy papers.
Figure 2B:
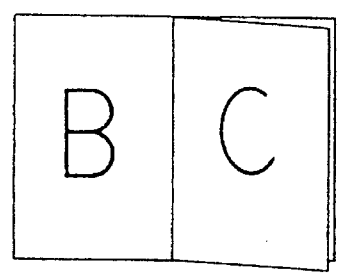
FIG. 2B is a diagram of a state when the papers shown in FIG. 2A are turned.
Figure 3A:
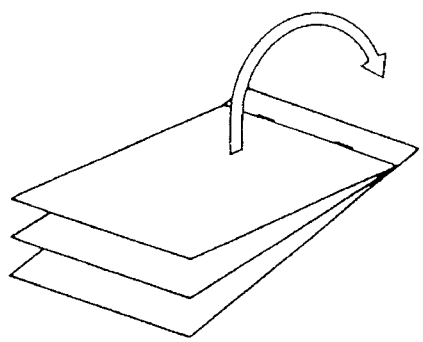
FIG. 3A is a perspective view of copy papers folded along the lateral direction of the copy papers.
Figure 3B:
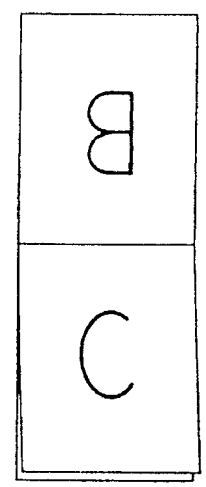
FIG. 3B is a diagram of a state when the papers shown in FIG. 3A are turned.

Referring now to the drawings, wherein like reference characters designate like or corresponding parts throughout the several views, embodiments of the present invention are explained.

(1) Structure of digital copying machine

Figure 7:
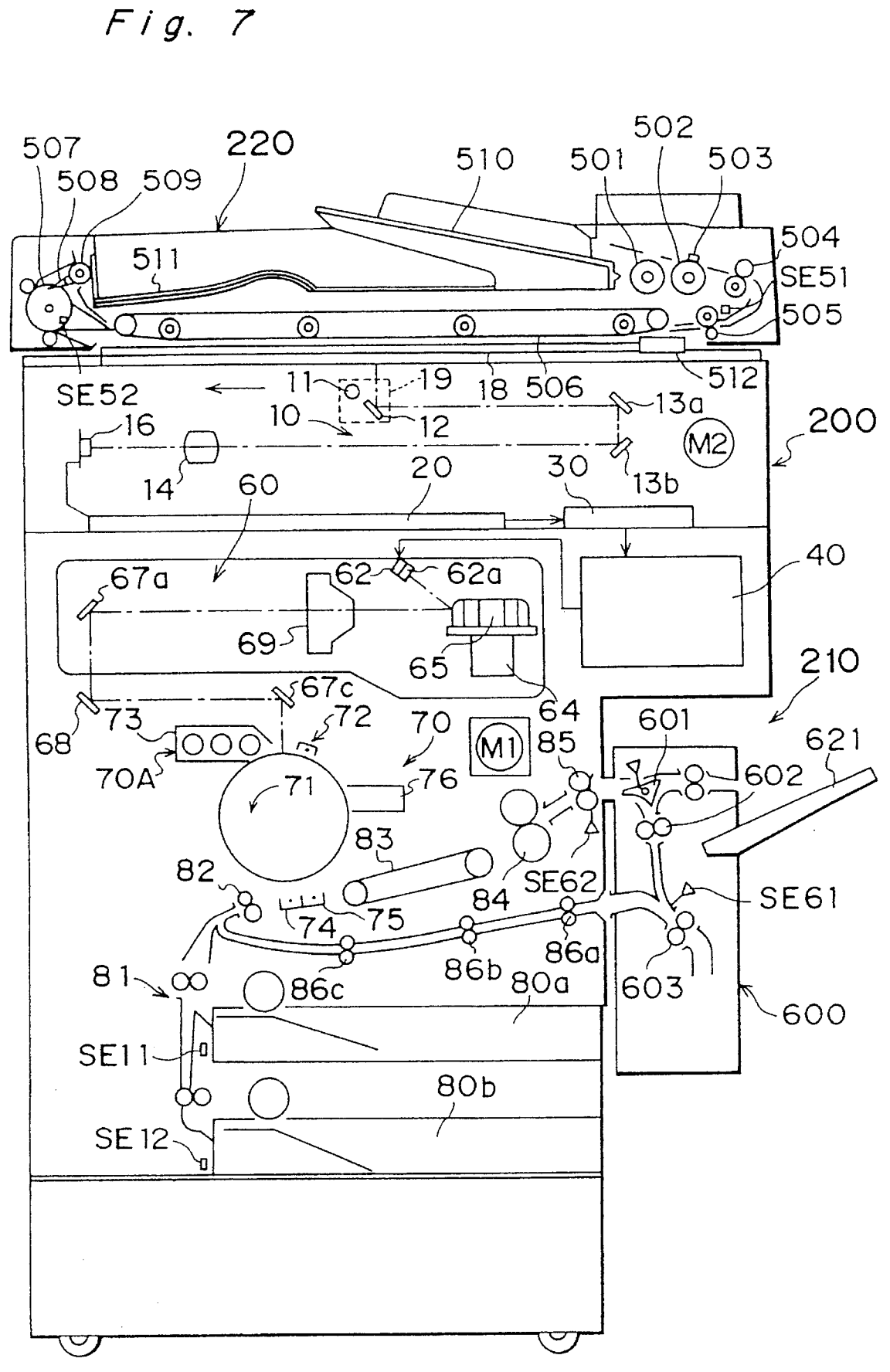

FIG. 7 shows a digital copying machine which comprises an image reader 200, a printer 210 and a document feeder 220. The image reader 200 comprises a scan system 10 which reads a document to convert optical signals thereof to image signals and an image signal processor 20 for processing the image signals received from the scan system 10. A exposure lamp 11 and a first mirror 12 are fixed to a first slider 19 which moves below a platen 18. Mirrors 13a and 13b are also fixed to a second slider (not shown) which also moves below the platen 18. A scan motor M2 drives the sliders. A light illuminated by the exposure lamp 11 is reflected from the document and reflected further by the mirrors 12, 13a and 13b. Then, the reflected light is transmitted through a lens 14 to be focused on an photoelectric device 16 having linear CCD sensors or the like. The device 16 converts an image to electric signals. The image signal processor 20 processes the image signals received from the photoelectric converter 16 and send image data to a memory unit 30 which will be explained later.

The printer 210 comprises a print processor 40 for driving a laser diode 62 according to the image data, an optical system for exposing a photoconductor drum 71 with a laser beam of the laser diode 62 and an image forming system for developing a latent image formed on the photoconductor drum 7 and forming the image on a paper. The print processor 40 provides signals to the laser diode 62 in the optical system 60. The laser diode 62 modulates a beam according to the signals, and the beam is reflected by a polygon mirror 65, passes a lens 66 and reflected further by mirrors 67a, 68 and 67c to expose the photoconductor drum 71. Thus, a latent image is formed on a photoconductor drum 71 in the image forming system.

In the image forming system, a first sensitizing charger 72a, a development unit 73a, a transfer charger 74, a separation charger 75 and a cleaning unit 76 are arranged around the photoconductor drum 71. The development unit 73 includes a two-component development material of toners and carriers. The latent image on the photoconductor drum 71 is developed by the development unit 73. On the other hand, a plurality of papers are installed in a cassette 80a or 80b, and one of them is carried through a guide 81 to a timing roller 82. A size of a carried paper is detected by a sensor SE11 or SE12. Then, it is carried at an appropriate timing toward the photoconductor drum 71 and the toner image is transferred by the transfer charger 74 on the papers and is separated by the separation charger 75 from the photoconductor drum 71. It is carried further by a conveying belt 83 to fixing rollers 84 which fixed the toner image on the paper. Then, the fixed paper is discharged by rollers 85 through a re-carriage system 600 onto a discharge tray 621. The discharge is detected by a sensor SE62.

The re-carriage system 600 is provided for carrying back a paper discharged by the rollers 85 to the timing roller 82. In two-face copy mode where images are formed on two faces of a paper, a face of the discharged paper is reversed and carried back to the timing roller 82, and another image is formed on a back face of the paper. A claw 601 is moved upside and a discharged paper is guided towards rollers 602. Then, the paper is carried by the rollers 602 and reverse rollers 603. If a bottom end of the paper is detected by a sensor SE61, the reverse rollers 603 are reversed and the paper is guided through the rollers 86a, 86b and 86c to the timing roller 82.

The document feeder 500 feed documents set on a document tray 510 one by one onto the platen 18 and discharge the document after it is read by the image reader 200. In a single face document mode, documents stacked on the tray 510 are carried one by one from a document located at the bottom among the documents by rollers 501, 502 and 504 and a timing roller 505 and is located on the platen 18 precisely. A length of the document is detected by sensors SE51. Then, the document on the platen 18 is read by the image reader 200. After the document is read, it is carried by a conveyer belt 506 towards left and carried reversely by a roller 507, guided by a claw 508 and discharged by a roller 509 onto a tray 511 with its face up.

In a two-face document mode, an image on a front face of a document located on the platen 18 is read as explained above in the single-face mode. The claw 508 is moved upward while the image on a front face is read. After the front face of the document is read, it is carried by the roller 507 and guided below the claw 508 towards the platen 18 reversely. The scanner 19 moves left and stops at an appropriate position for reading the back face in correspondence to the length of the document. This position is a little right from a position where the top of the document after the reversal and the bottom before it agree with each other. If the length a document is too short, the left side of the platen 18 is set as the position. The document length has been detected by the sensors SE51 while the document is feed. Then, the document is carried by the conveyer belt 506 left at a constant speed in correspondence to the magnification power while the back face of the document is read at the above-mentioned position by the image reader 200. The claw 508 is moved downward. After the back face is read, a moving direction of the conveyer belt 506 is reversed again, and the document is carried and discharged by the rollers 507 and 509 onto the tray 511 with its front face up.

Figure 8:
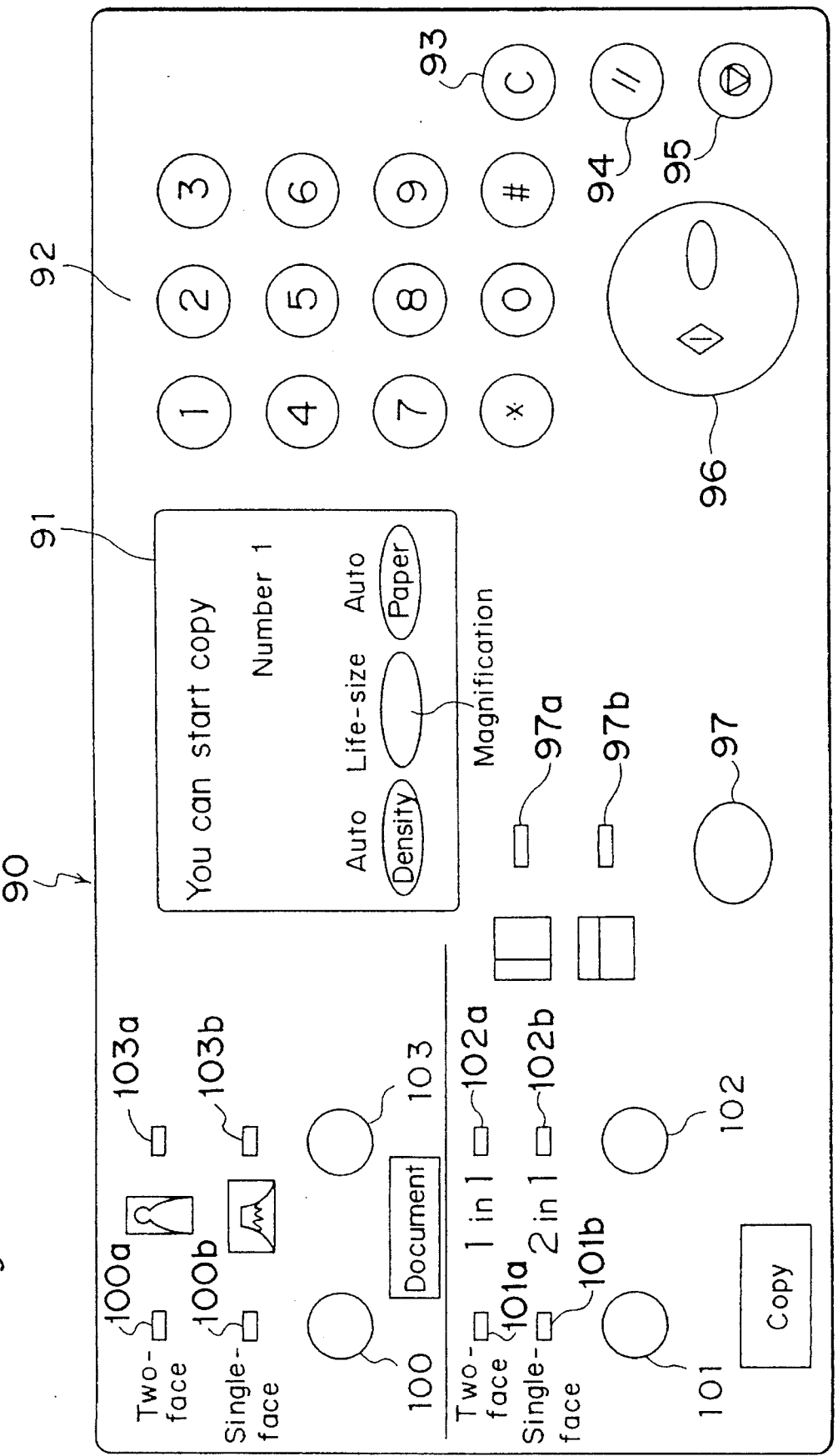
FIG. 8 is a plan view of an operational panel.

FIG. 8 shows an operational panel 90 of the digital copying machine, and it has a liquid crystal touch panel 91, various keys 92–97, 100–103 and light-emitting diode (LED) displays 100a, 100b, 101a, 101b, 102a and 102b. Ten-keys 92 are used to setting a number of papers to be copied for a document or a magnification power for copy. A clear key 93 is used to set the number as "1" or the like. A reset key 94 is used to return to standard conditions. A stop key 95 is used to stop copy operation. A start key 96 is used to start copy operation. A margin key 97 is used to select if the margin is set at left side or at top side. A key 100 is used to select if a document is a single-face document or a double-face document. A copy mode key 101 is used to select two-face copy mode or single-face copy mode. A 2-in-1 key 102 is used select 1-in-1 mode (normal copy mode) or 2-in-1 mode. A document direction key 103 is used to select document direction of portrait or landscape.

The touch panel 91 displays various statuses such as jam, serviceman call, paper empty and the like, various modes on exposure level, magnification power, paper size and the like and receives touch-inputs for mode selection.

Figure 9A:
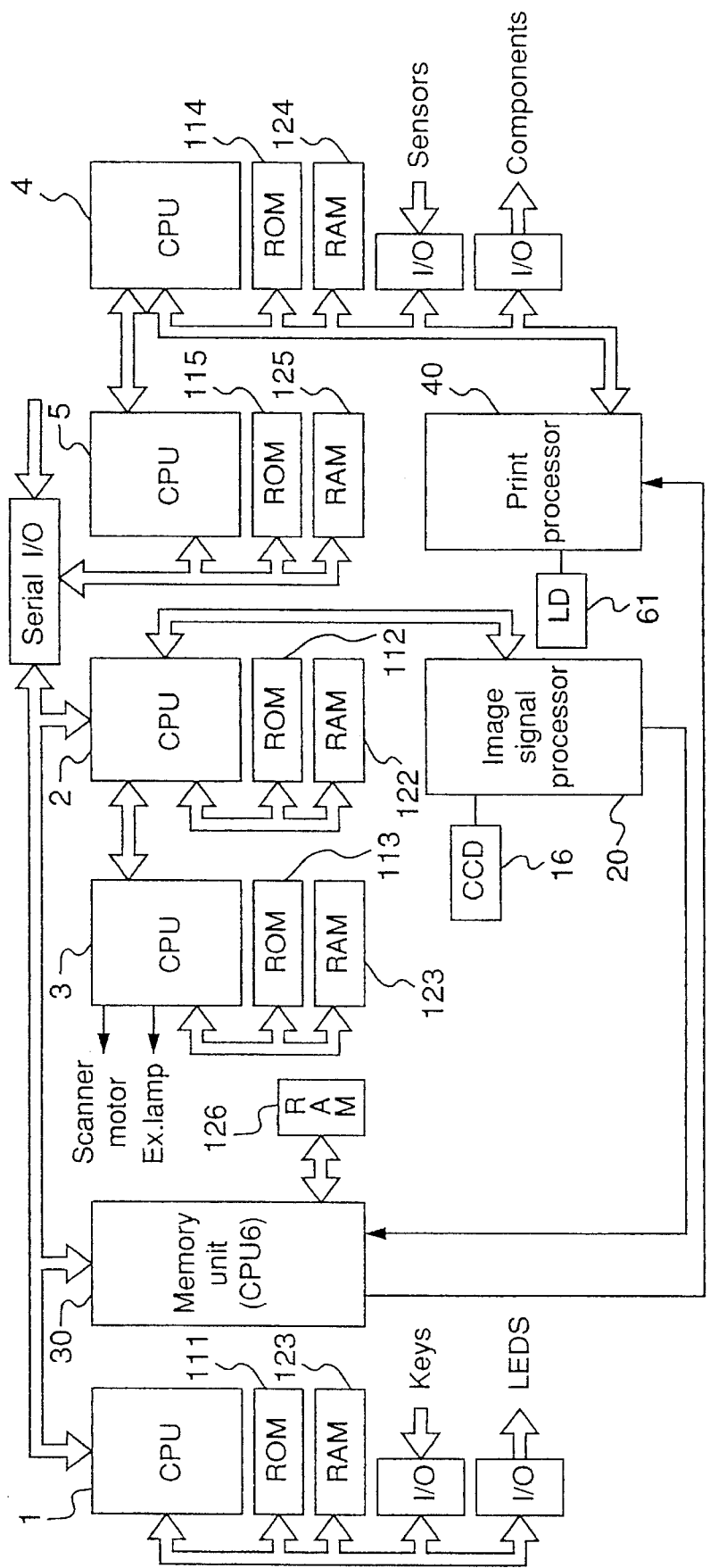
FIGS. 9A and 9B are a block diagram of a control section of the copying machine.
Figure 9B:
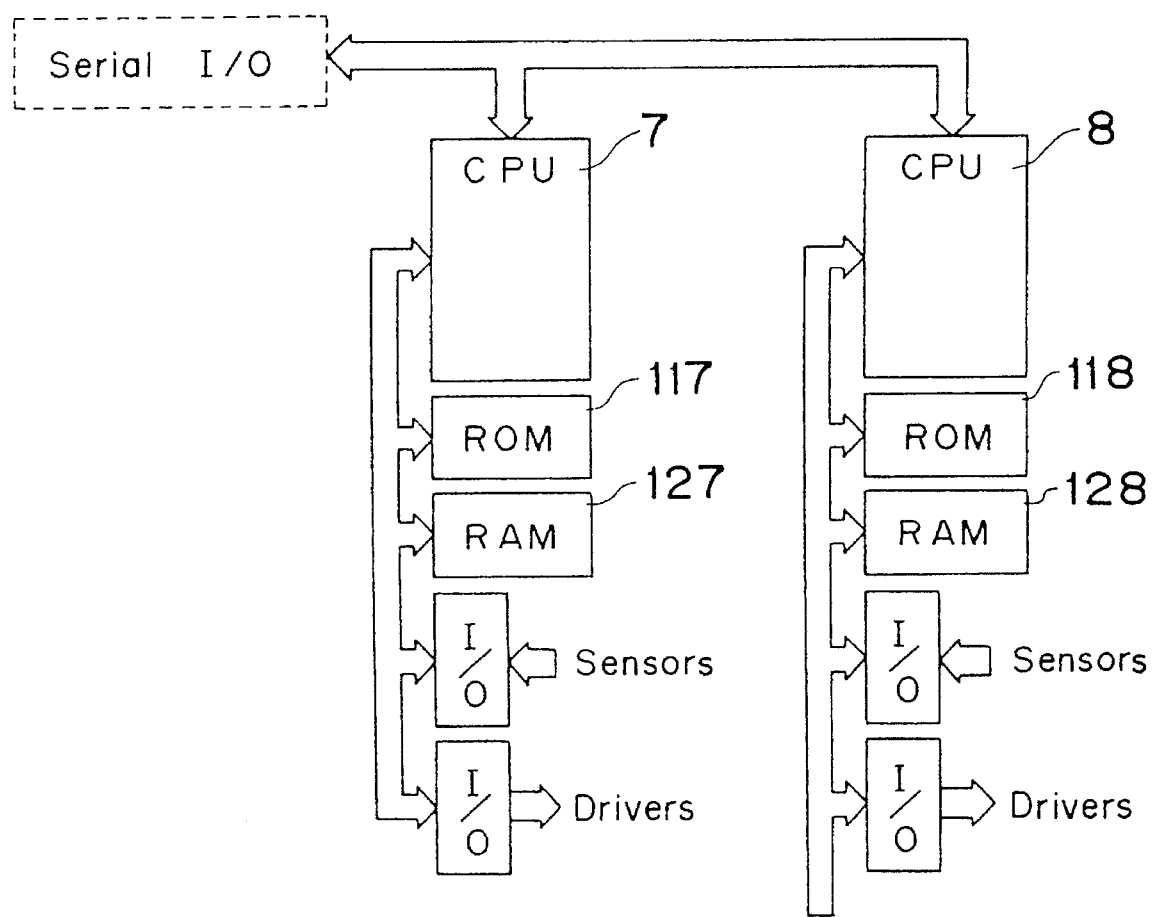

FIGS. 9A and 9B show a block diagram of a control section 100 of the copying machine 1. The controller 100 consists of eight central processing units (CPUs) 1–8, each of which is connected to a read only memory (ROM) 111–118 storing programs and a random access memory (RAM) 121–128 used as a work area. The CPU 6 is provided in a memory unit 30.

The CPU 1 controls key-input signals from the operational panel 90 and displays therein. The CPU 2 controls the image signal processor 20. The CPU 3 controls the scan system 10. The CPU 4 controls the print processor 40, the optical system 60 and the image forming system 70. Especially, the CPU 4 manages the size of a copy paper according to signals from the sensors SE11 and SE 12. The CPU 5 processes timing control and mode setting of the entire controller 100. The CPU 6 controls the memory unit 30 to store image data in an image memory 304 and to send them to the print system 40. The CPU 7 controls the document feeder 500. The CPU 8 controls the re-feed system 600. The CPUs 1–8 communicate commands, reports, data and the like with each other by using interrupts.

In the image signal processor 20 controlled by the CPU 2, an image signal received from the photoelectric converter 16 is converted by an A/D converter to a 8-bit image data for each pixel and the data is corrected for shading correction. Further, the data is processed if a magnification power is specified. Then, the image data is corrected for smoothing, edge emphasis and the like. Finally, image data D2 are supplied, and a 1-bit color data DC is also supplied for each pixel for representing if the color is a specified color or not.

Figure 10:
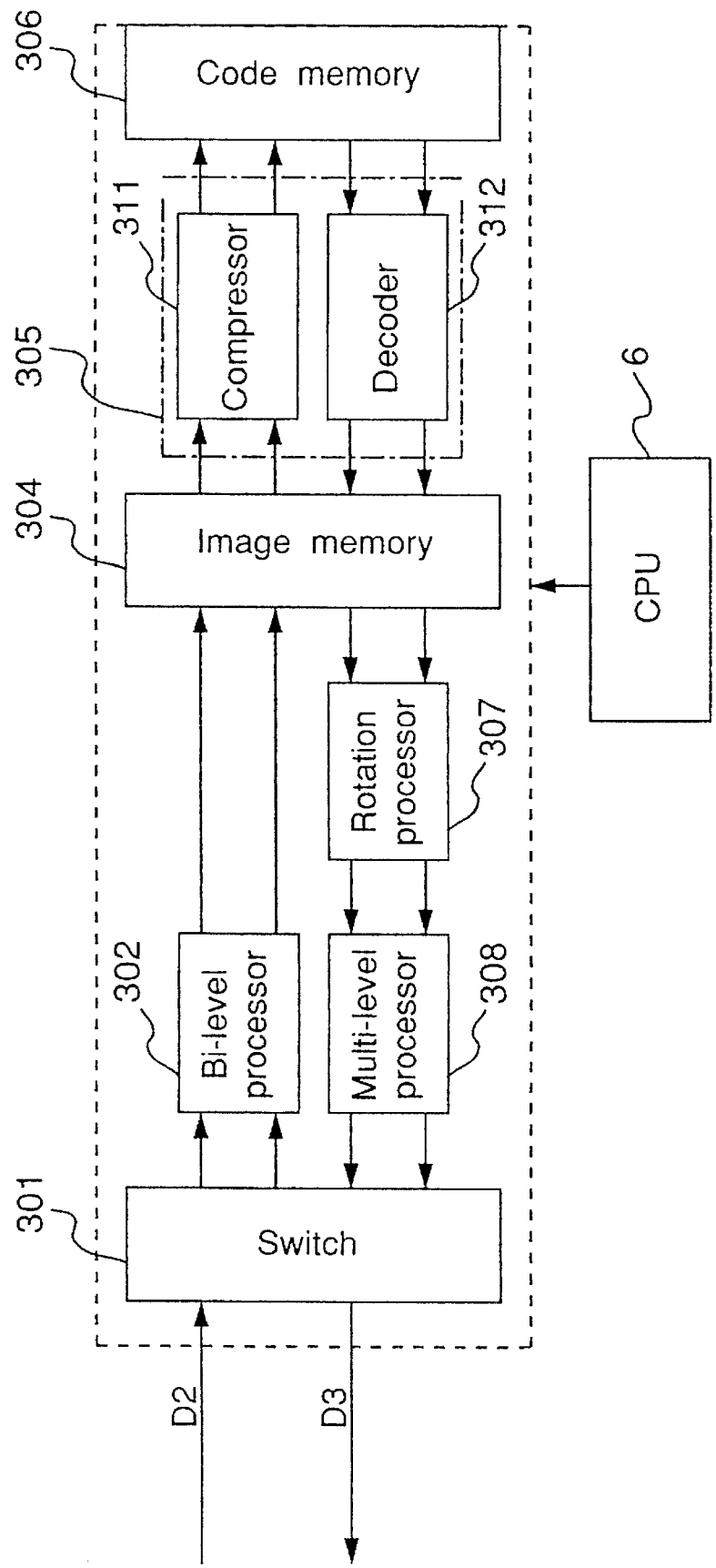
FIG. 10 is a block diagram of a memory unit.

FIG. 10 shows a block diagram of the memory unit 30 controlled by the CPU 6. Image data D2 is received through a switch 301 by a bi-level processor 302 which generates a bi-level data according to parameters supplied by the CPU 6, and the bi-level data is stored in a multi-port image memory 304 having a capacity to store image data of one page of A3 size paper at 400 dots per inch (dpi). For an image data of a document of $X_0*Y_0$ pixel data, write to the image memory 304 is started from address (0, 0). Then, data of a first line is written along X direction, data of a next line is written along X direction, and so on. The bi-level processor 302 performs not only a simple bi-level processing but also a pseudo-halftone bi-level processing. After the image data are written to the image memory 304, a compressor 311 in a code processor 305 reads the image data and converts them to code data to be stored in a multi-port code memory 306.

A decoder 312 in the code processor 305 reads the code data in the code memory 306 when it receives an instruction from the CPU 6, and decodes the code data to generate image data to be written to the image memory 304. (The decoder 312 operates independently of the compressor 305. Data can be transmitted with direct memory access between the code memory 306 and the compressor 311 or the decoder 312.) When a page of image data is written to the image memory 304 for decoding, a rotation processor 307 reads the image data to sends data in a state where the image is rotated by a rotation angle of 0°, 90°, 180° and 270° instructed by the CPU 6. For example, if the image is rotated by 90°, data are read sequentially from an address $(X_0, 0)$. If the image is rotated by 180°, data are read sequentially from an address $(X_0, Y_0)$. If the image is rotated by 270°, data are read sequentially from an address $(0, Y_0)$. A multi-level processor 308 generates a multi-level data D3 from the bi-level data supplied by the rotation processor 307 according to parameters set by the CPU 6. Then, image data D3 is sent through the switch 301.

Figure 11:
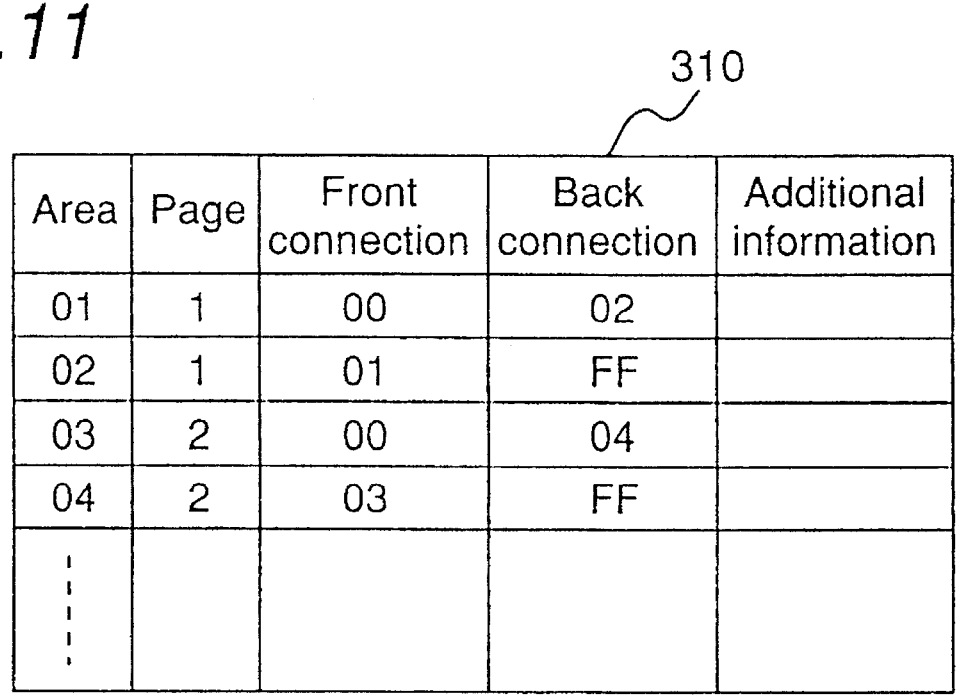
FIG. 11 is a diagram of a management table.
Figure 12:
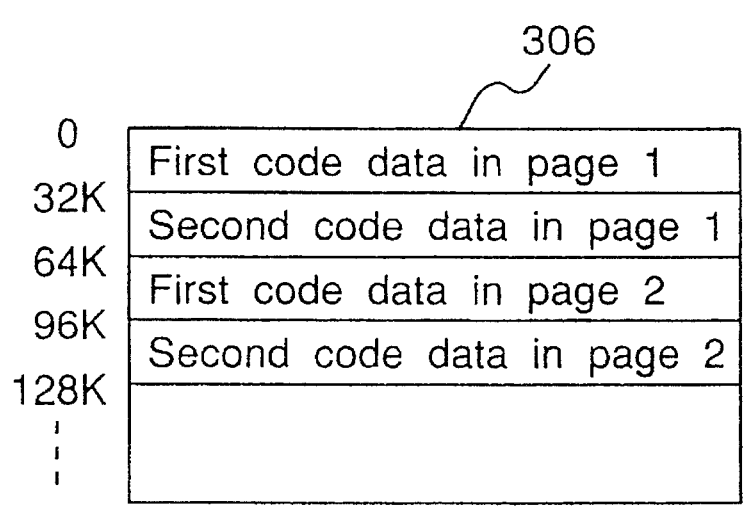
FIG. 12 is a diagram of a code memory.

The code memory 306 is managed by a management table 310. A relation exists between the management table 310 shown in FIG. 11 and the code memory 306 shown in FIG. 12. As shown in FIG. 11, the code memory 307 is divided into memory areas each of 32 kbytes, and code data for each page is written to each area in order to control the write (read) and read (print) at the same time. In FIG. 11, the management table 310 stores a number for representing an area in the code memory 306, a page number, numbers of front connection and back connection on connected areas and various additional information such as compression method, data length and the like. A number such as "00" of the front connection means a first area in each page, while a number such as "FF" in the back connection means a last area in each page. When image data are read from the image memory 304 for data compression, the CPU 6 controls the compressor 311 to store code data in the code memory 306 while preparing information for the management table 310. When the code data are read from the code memory 306 for decoding, the CPU 6 refers the management table 310. The information in the management table 310 is erased when all the code data on the page is read out normally.

(2) Image memory and output image with relation to document types of portrait and landscape The digital copying machine explained above has various modes which are set by a user with the operational panel 90 (FIG. 8). A single-face document or a two-face document is selected with the key 100. Two-face copy mode or single-face copy mode is selected with the copy key 101. The margin can be set by the margin key 97 at left side or at top side. The margin width is set as a fixed value of say 10 mm in this embodiment, but it is understood that the margin width can be modified easily by making it possible to select a margin width. 1-in-1 mode (normal copy operation) or 2-in-1 mode is selected with the 2-in-1 key 102. In the 2-in-1 mode, two documents are printed on a single face of a paper side by side.

Figure 13A:
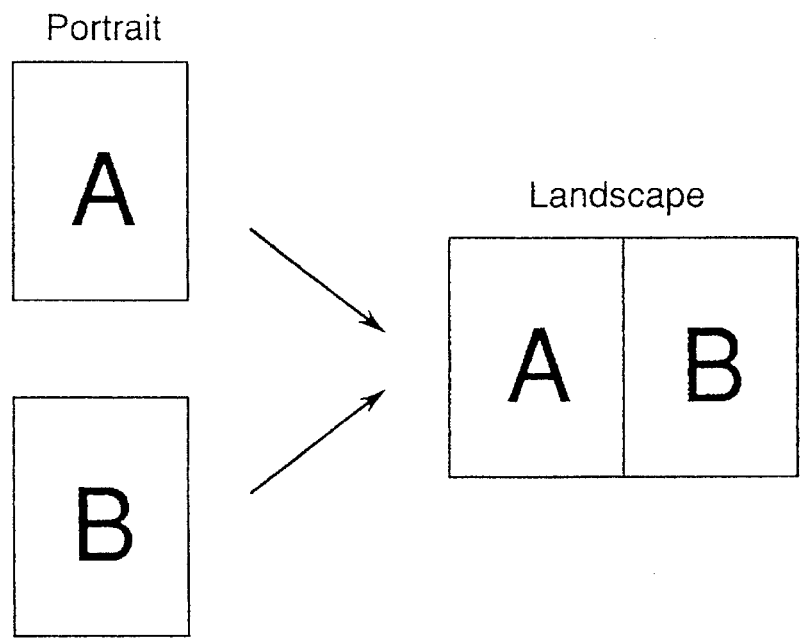
FIGS. 13A and 13B are diagrams of document images of two portrait documents and two landscape documents produced in the 2-in-1 copy mode, respectively.
Figure 13B:
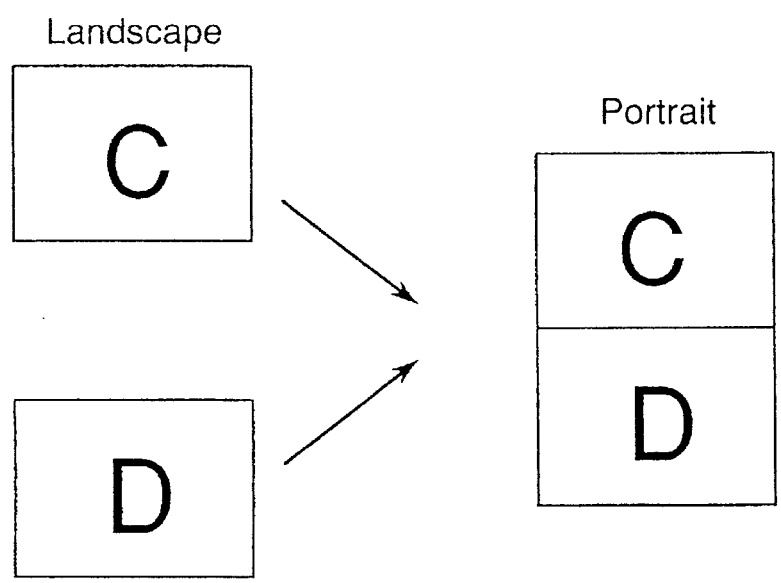

The document size (length and width) is determined with the sensors SE51 provided in the automatic document feeder. It is decided from the signals of the sensors SE51 if the document to be copied is longitudinal or not along the document feed direction. On the other hand, document direction of portrait or landscape is set with the key 103. If the document direction is not specified by a user, a document longitudinal along the document feed direction is specified automatically as a landscape document, otherwise the document is specified as a portrait document. In the 2-in-1 copy mode, the setting of portrait is changed to landscape and vice versa automatically, as shown in FIGS. 13A and 13B, because the longitudinal direction of the two document images is perpendicular to a longitudinal direction of the synthesized image from the two documents.

The bi-level data is stored in the image memory 304. For an image data of a document of $X_0*Y_0$ pixel data, write to the image memory 304 is started from address (0, 0). In the 2-in-1 copy mode, after image data of a first document is read and stored in the image memory 304, image data of a second document is read and stored in the image memory successively adjacent vertically or horizontally to an area where the image data of the first document is stored. The rotation processor 307 reads the image data to send data in a state where the image is rotated by a rotation angle of 0°, 90°, 180° and 270° instructed by the CPU 6 according to the copy modes.

It is to be noted that the direction of copy paper is reversed in the printing of back face of document in two-face copy mode, as explained above with reference to the recarriage system 600 or the back face of the copy paper is printed from the bottom side. However, in the explanation on the rotation angle given below, this reversal is not considered in order to avoid unnecessary confusion to understand the embodiment. That is, the rotation angle is stated by assuming that the back face of the copy paper is also supplied from the top side as the front face thereof. Actually, the rotation processor 307 rotates the image data by 180° for the image data of the back face besides the above-mentioned rotation angle in the two-face copy mode.

FIG. 14A–14D show document image data in various directions stored in the image memory 304. When image data are read, a line address denotes an address in X direction (main scan direction) and a column address denotes an address in Y direction (subscan direction), and an origin is set at the leftmost address in a top line. A portrait document denotes a document which has an image longer along the longitudinal direction than the lateral direction. In a portrait document shown in FIG. 14A, the document is fed onto the platen 18 along a lateral direction which is perpendicular to the longitudinal direction of the document. On the other hand, in a portrait document shown in FIG. 14B, the portrait document is fed onto the platen 18 so that the longitudinal direction of the document is in parallel to the direction along which the document is fed. A landscape document denotes a document which has an image longer along the lateral direction. In a landscape document shown in FIG. 14C, the document is fed onto the platen 18 along a lateral direction which is perpendicular to the direction along which the document is fed. On the other hand, in a landscape document shown in FIG. 14D, a document is fed onto the platen 18 so that the longitudinal direction is in parallel to the direction along which the document is fed.

FIGS. 15A–15D show images reproduced on copy papers in the two-face copy mode with a margin by using image data stored in the image memory 304 according to the processing explained in detail below. It is to be noted that the position of the margin for a back face is changed automatically to a reverse side to that for a front face, that is, from left to right and from top to bottom. In a case shown in FIG. 15A, copy papers of portrait documents are bound at the left side. For copy papers printed in the two-face mode shown at the right side, an image "A" is printed on a front face with a margin at the right side, while an image "B" shown with a dashed line is printed on a back face with a margin at the left side. On the other hand, in a case shown in FIG. 15B, copy papers of portrait documents are bound at the top side. For copy papers printed in the two-face mode shown at the right side in FIG. 15B, an image "A" is printed on a front face with a margin at the top side, while an image "B" shown with a dashed line is printed on a back face with a margin at the bottom side. In a case shown in FIG. 15C, copy papers of landscape documents are bound at the left side. For a two-face mode shown at the right side in FIG. 15C, an image is printed on a front face with a margin at the right side, while another image shown with a dashed line is printed on a back face with a margin at the left side. On the other hand, in a case shown in FIG. 15D, copy papers of landscape documents are bound at the top side. For a two-face mode shown at the right side in FIG. 15D, an image is printed on a front face with a margin at the top side, while an image "B" shown with a dashed line is printed on a back face with a margin at the bottom side. Then, such copy papers are binded at the margin positions, a user can always see normal images when the papers are turned over.

When image data stored in the image memory 304, as shown in FIGS. 14A–14D, is reproduced on a paper as shown in FIGS. 15A–15D, a rotation processor 307 provided in the memory unit 30 (FIG. 10), the image data read from the image memory 304 are rotated according to copy modes. For an image data of a document of $X_0*Y_0$ pixel data, write to the image memory 304 is started from address (0, 0). The rotation processor 307 reads the image data to send data in a state where the image is rotated by a rotation angle of 0°, 90°, 180° and 270° instructed by the CPU 6 according to the copy modes. For example, if the image is rotated by 90°, data are read sequentially from an address ($X_0$, 0). If the image is rotated by 180°, data are read sequentially from an address ($X_0$, $Y_0$). If the image is rotated by 270°, data are read sequentially from an address (0, $Y_0$). This rotation according to copy modes is explained below.

In the image data illustrated at the left side of FIGS. 16–23, margins are denoted with dashed lines. That is, if a margin is specified by a user, when a document is read, the timing of write of image data to the image memory 304 is controlled so that the area for the margin is not written. Thus, the image written to the image memory 304 is displaced by the margin horizontally or vertically. For example, if the margin is set at the left, the image data along each line is written after a prescribed X row address in correspondence to the left margin, while if the margin is set at the top, the image data is written after a prescribed Y address in correspondence to the top margin. The left and top of the margin position represent a position of margin with respect to the direction of an image in the document or the document direction (portrait and landscape) which is selected with the key 103.

FIG. 16 shows first and second portrait document image data stored in the image memory 304 with margins set at the left side and at the right side, respectively, and output images thereof on copy papers when portrait documents are formed on front and back faces of a paper. The image data of first and second faces are read from the image memory 304 without rotation (0°). That is, in a two-face copy mode, an image of a first document is read and stored in the image memory 304. Then, the image data is reproduced on a front face of a paper. Next, an image of a second document is read and stored in the image memory 304. Then, the image data is reproduced on a back face of the paper.

FIG. 17 shows first and second portrait document image data stored in the image memory 304 with margins set at the top side and at the bottom side, respectively, and output images thereof are formed on front and back faces of a paper. FIG. 17 is the same as FIG. 16 except that the margin is set at the top and bottom sides. In this case, the image data of first face is read from the image memory 304 without rotation (0°), while that of second face is read from the image memory 304 with rotation of 180°.

Figure 18:
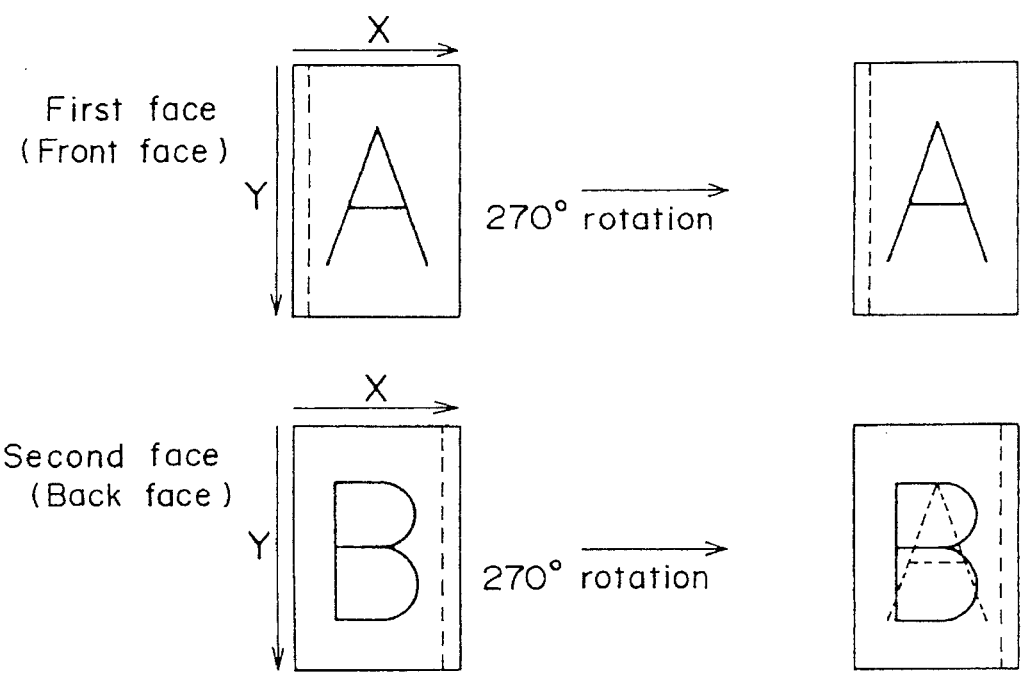
FIG. 18 is a diagram for illustrating portrait documents fed along a longitudinal direction thereof and output images thereof on papers with a left margin.

FIG. 18 shows first and second portrait document image data stored in the image memory 304 with margins set at the left side and at the right side, respectively, and output images thereof are formed on front and back faces of a copy paper. FIG. 18 is the same as FIG. 16 except the direction of feeding a document. The image data of first and second faces are read from the image memory 304 with rotation of 270°.

Figure 19:
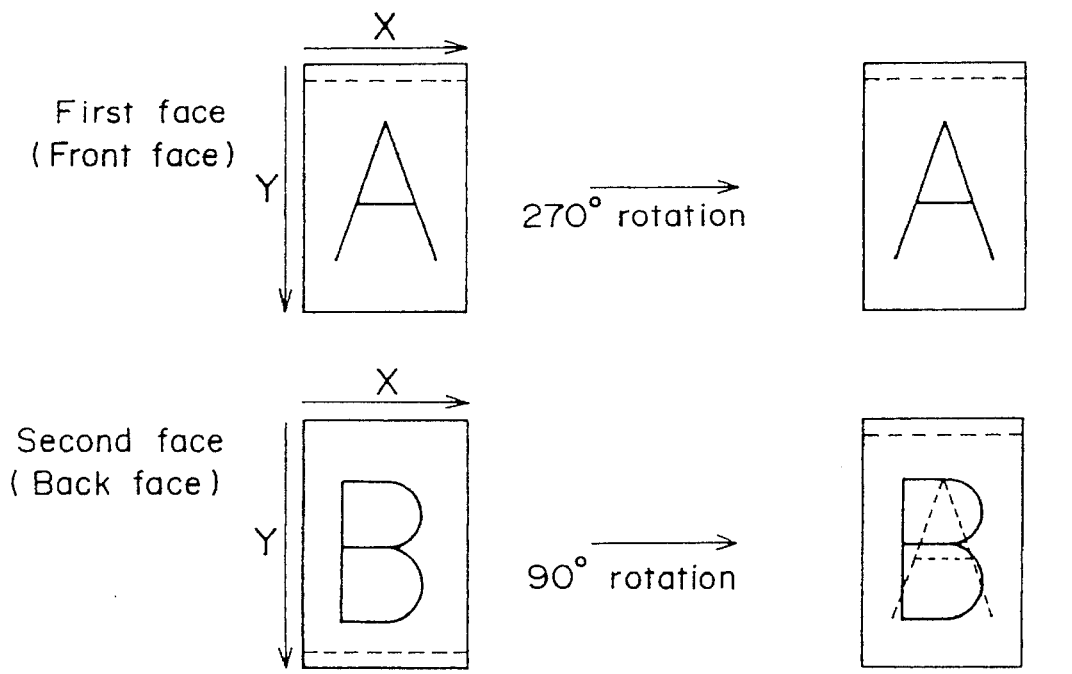
FIG. 19 is a diagram for illustrating portrait documents fed along a longitudinal direction thereof and output images thereof on papers with a top margin.

FIG. 19 shows first and second portrait document image data stored in the image memory 304 with margins set at the top side and at the bottom side, respectively, and output images thereof are formed on front and back faces of a copy paper. FIG. 19 is the same as FIG. 16 except that the margin is set at the top and bottom sides. In this case, the image data of first face is read from the image memory 304 with rotation of 270°, while that of second face is read from the image memory 304 with rotation of 90°.

Figure 20:
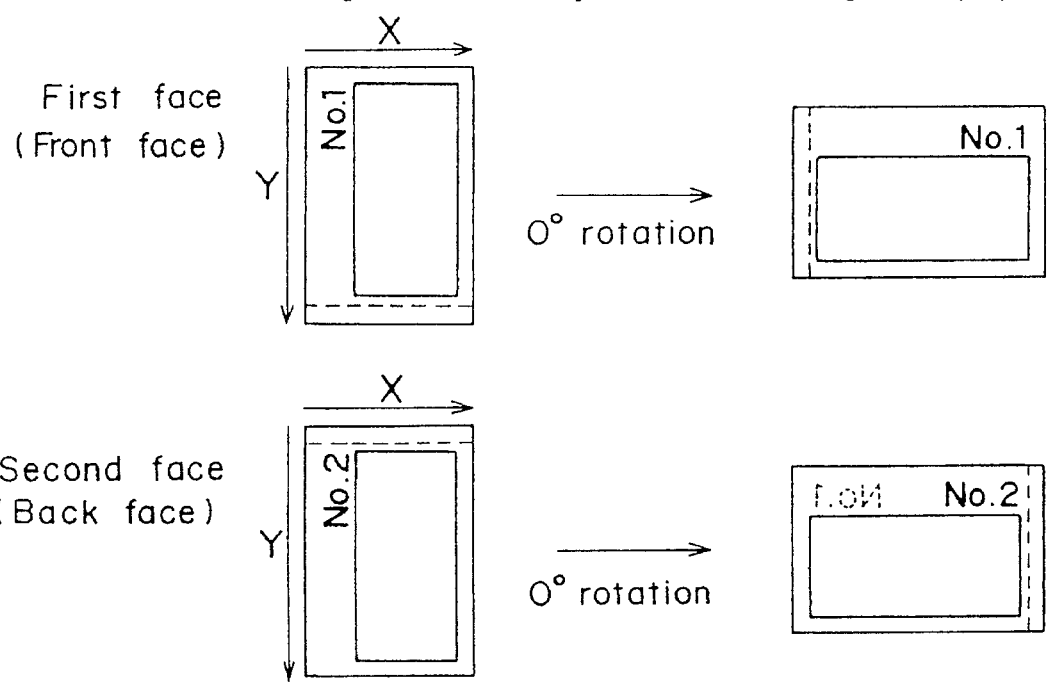
FIG. 20 is a diagram for illustrating landscape documents fed along a longitudinal direction thereof and output images thereof on papers with a left margin.

FIG. 20 shows first and second landscape document image data stored in the image memory 304 with margins set at the left side and at the right side, respectively, and output images thereof are formed on front and back faces of a copy paper. The image data of first and second faces are read from the image memory 304 without rotation (0°).

Figure 21:
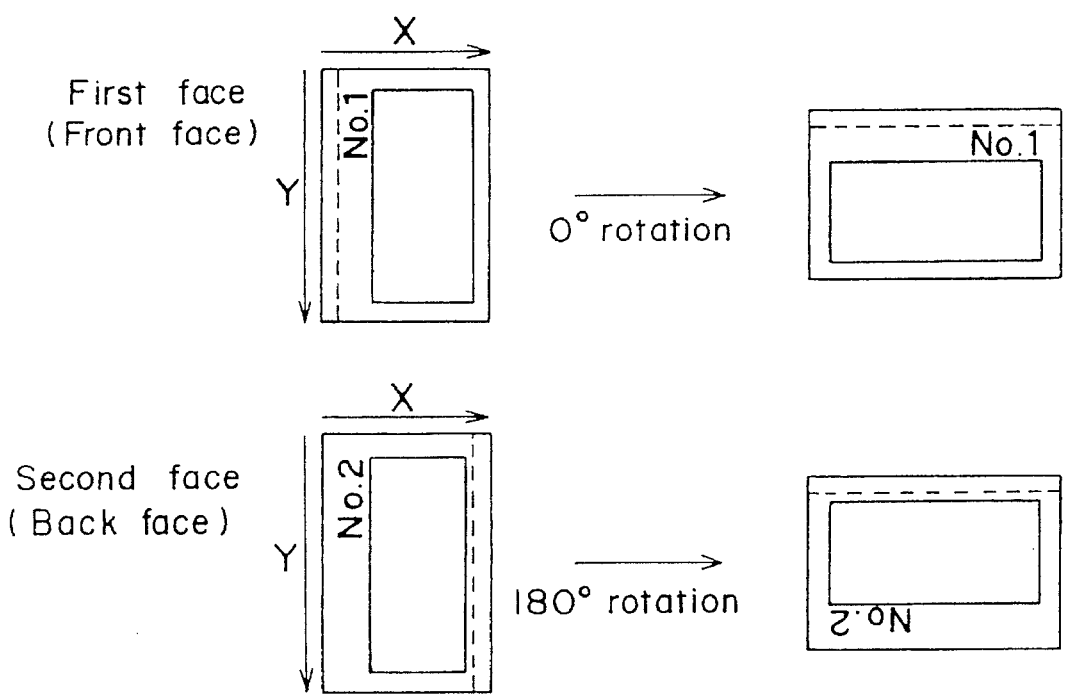
FIG. 21 is a diagram for illustrating landscape documents fed along a longitudinal direction thereof and output images thereof on papers with a top margin.

FIG. 21 shows first and second landscape document image data stored in the image memory 304 with margins set at the top side and at the bottom side, respectively, and output images thereof are formed on front and back faces of a copy paper. FIG. 21 is the same as FIG. 20 except that the margin is set at the top and bottom sides. In this case, the image data of first face is read from the image memory 304 without rotation (0°), while that of second face is read from the image memory 304 with rotation of 180°.

Figure 22:
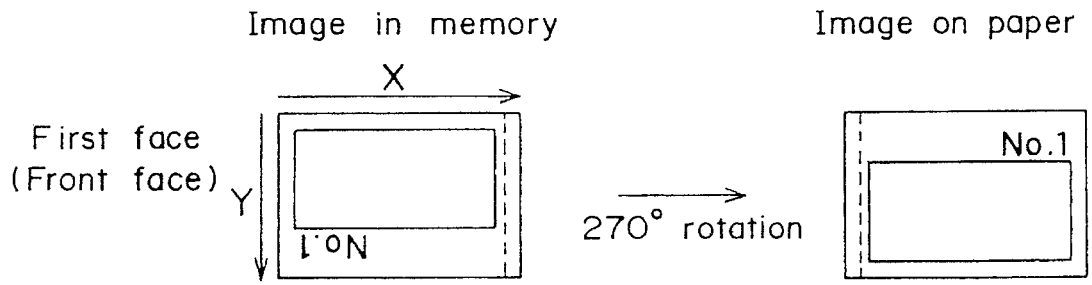
FIG. 22 is a diagram for illustrating landscape documents fed along a lateral direction thereof and output images thereof on papers with a left margin.

FIG. 22 shows first and second landscape document image data stored in the image memory 304 with margins set at the left side and at the right side, respectively, and output images thereof are formed on front and back faces of a copy paper. FIG. 22 is the same as FIG. 20 except the direction of feeding a document. The image data of first and second faces are read from the image memory 304 with rotation of 270°.

Figure 23:
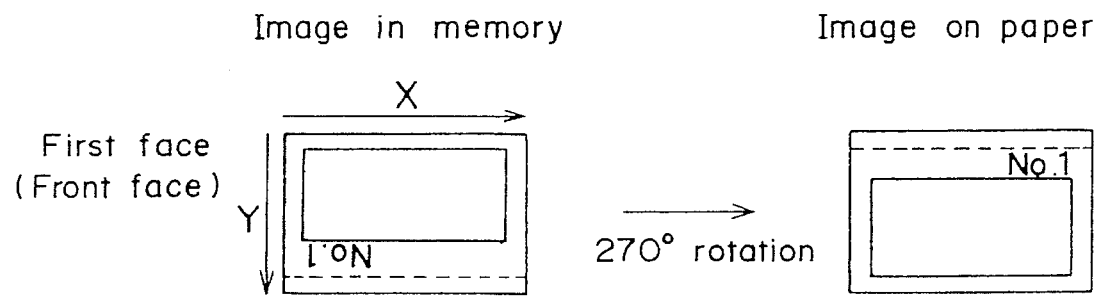
FIG. 23 is a diagram for illustrating landscape documents fed along a lateral direction thereof and output images thereof on papers with a top margin.

FIG. 23 shows first and second landscape document image data stored in the image memory 304 with margins set at the top side and at the bottom side, respectively, and output images thereof are formed on front and back faces of a copy paper. FIG. 23 is the same as FIG. 22 except that the margin is set at the top and bottom sides. In this case, the image data of first face is read from the image memory 304 with rotation of 270°, while that of second face is read from the image memory 304 with rotation of 90°.

As explained above, in the 2-in-1 copy mode and the two-face mode in combination, two document images are synthesized in the image memory 304. Further, the setting of portrait is changed to landscape and vice versa automatically, as shown in FIGS. 13A and 13B, and the rotation angle is determined by the corrected document direction. Then, the synthesized images are formed on papers similarly as in the above-mentioned simple two-face copy mode as shown in FIGS. 16–23.

(3) Detail explanation of the operations by the CPUs

Figure 24:
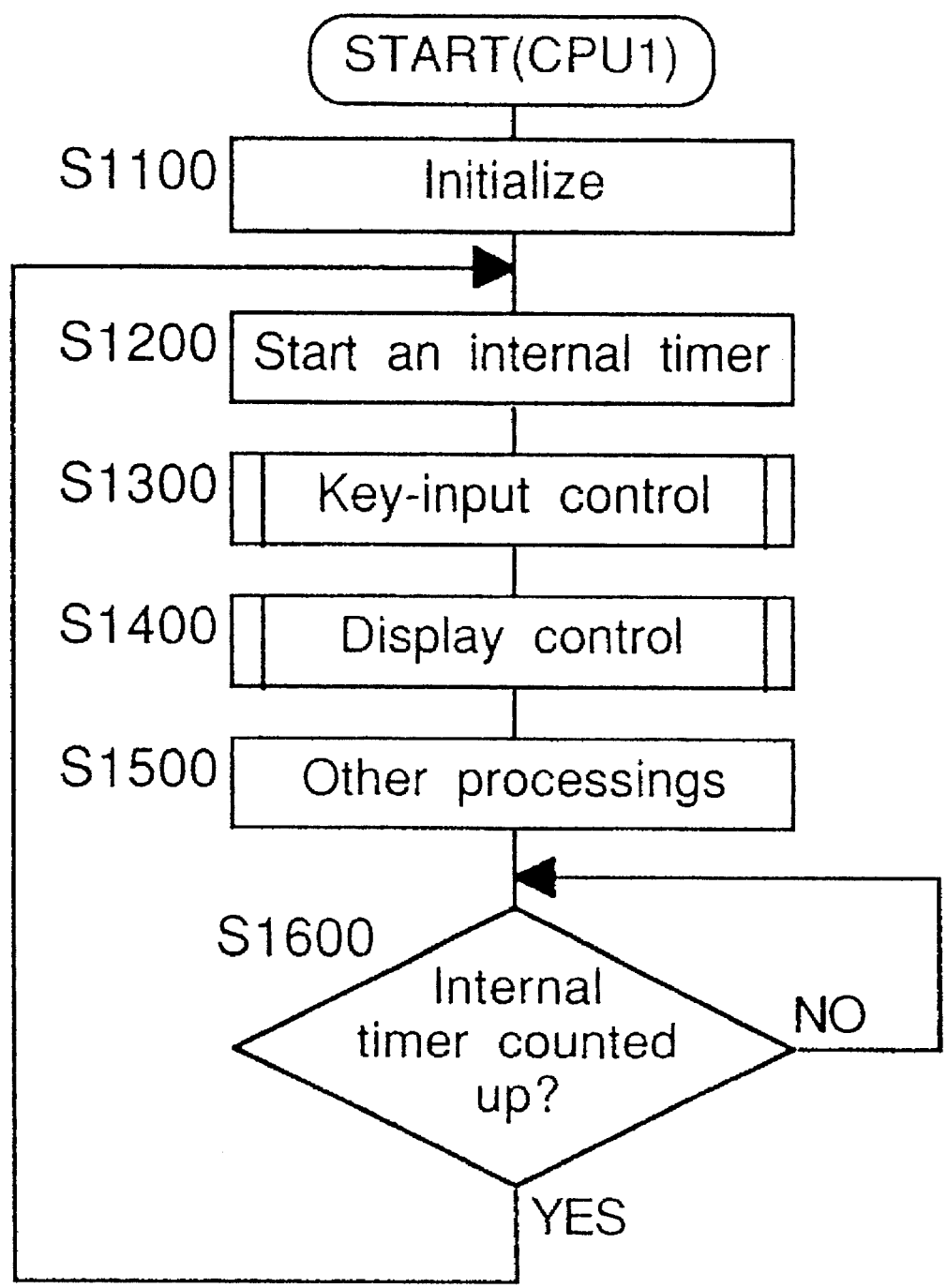
FIG. 24 is a main flowchart of CPU 1 which controls an operational panel.

The operation of the copying machine 1 is explained below in detail with reference to flowcharts. FIG. 24 shows a main flowchart of the CPU 1 which controls key-inputs and displays for the operational panel 90. First, the CPU 1 is initialized (step S1100). Then, an internal timer is started for monitoring to keep a time needed for one routine of this flow constant (step S1200), and key-input control (step S1300), and display control (step S1400) are performed successively. Then, other processings not explained here are performed (step S1500). Then, it is waited that the timer is counted up (step S1600), and the flow returns to step S1200. The CPU 1 communicates with other CPUs 2–8 by interrupt processing.

Figure 25A:
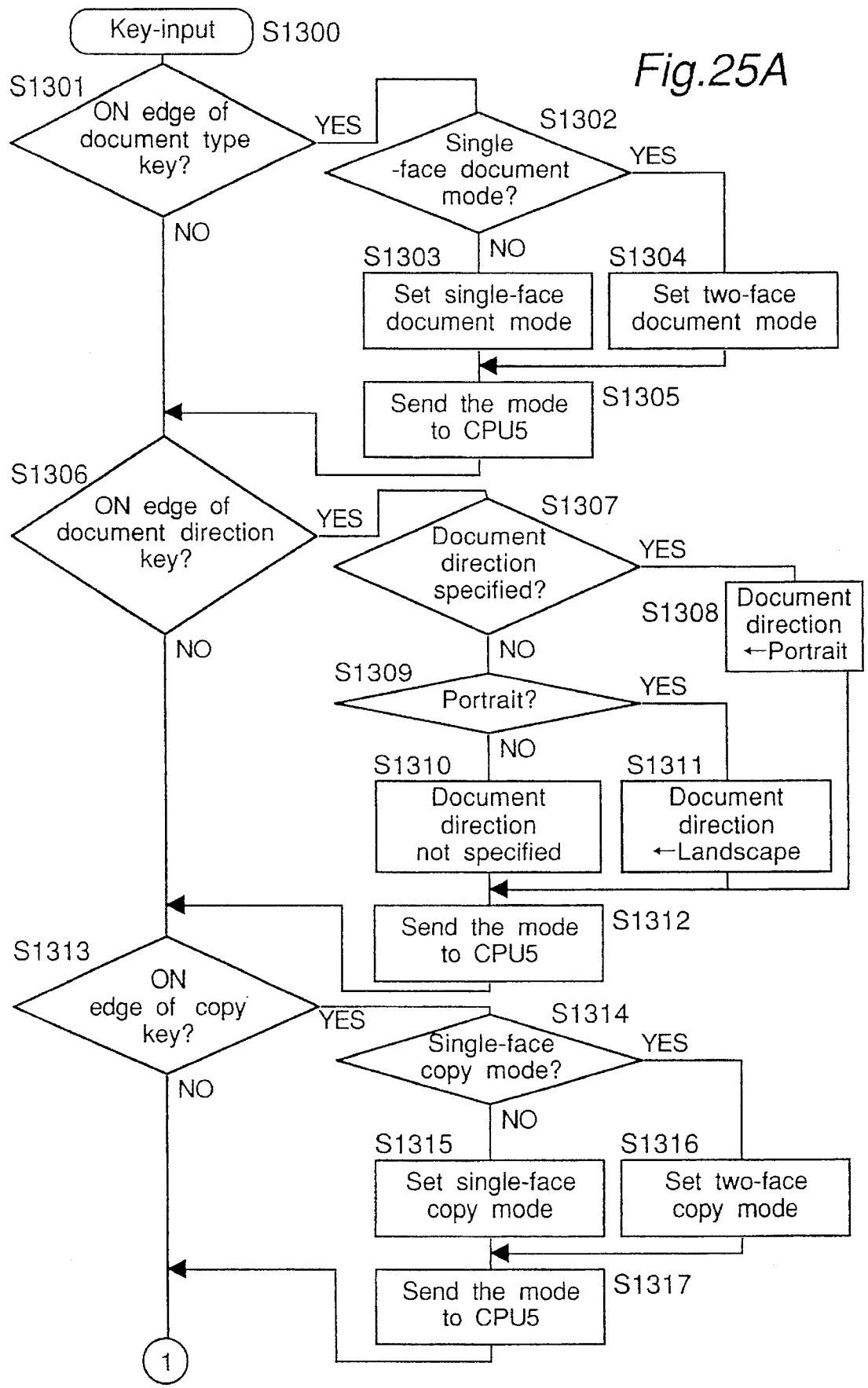
FIGS. 25A, 25B and 25C are a flowchart of key-input control.
Figure 25B:
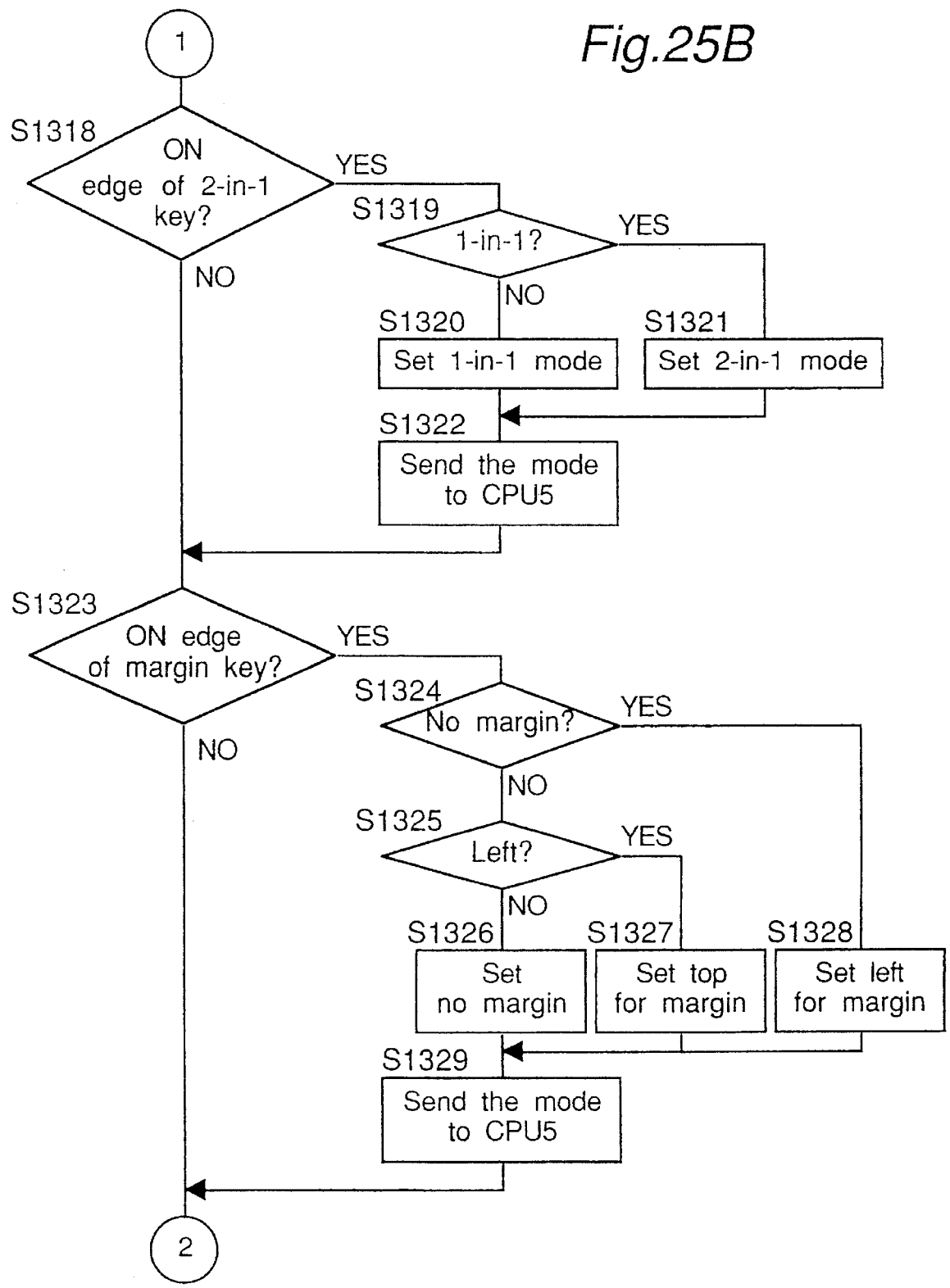
Figure 25C:
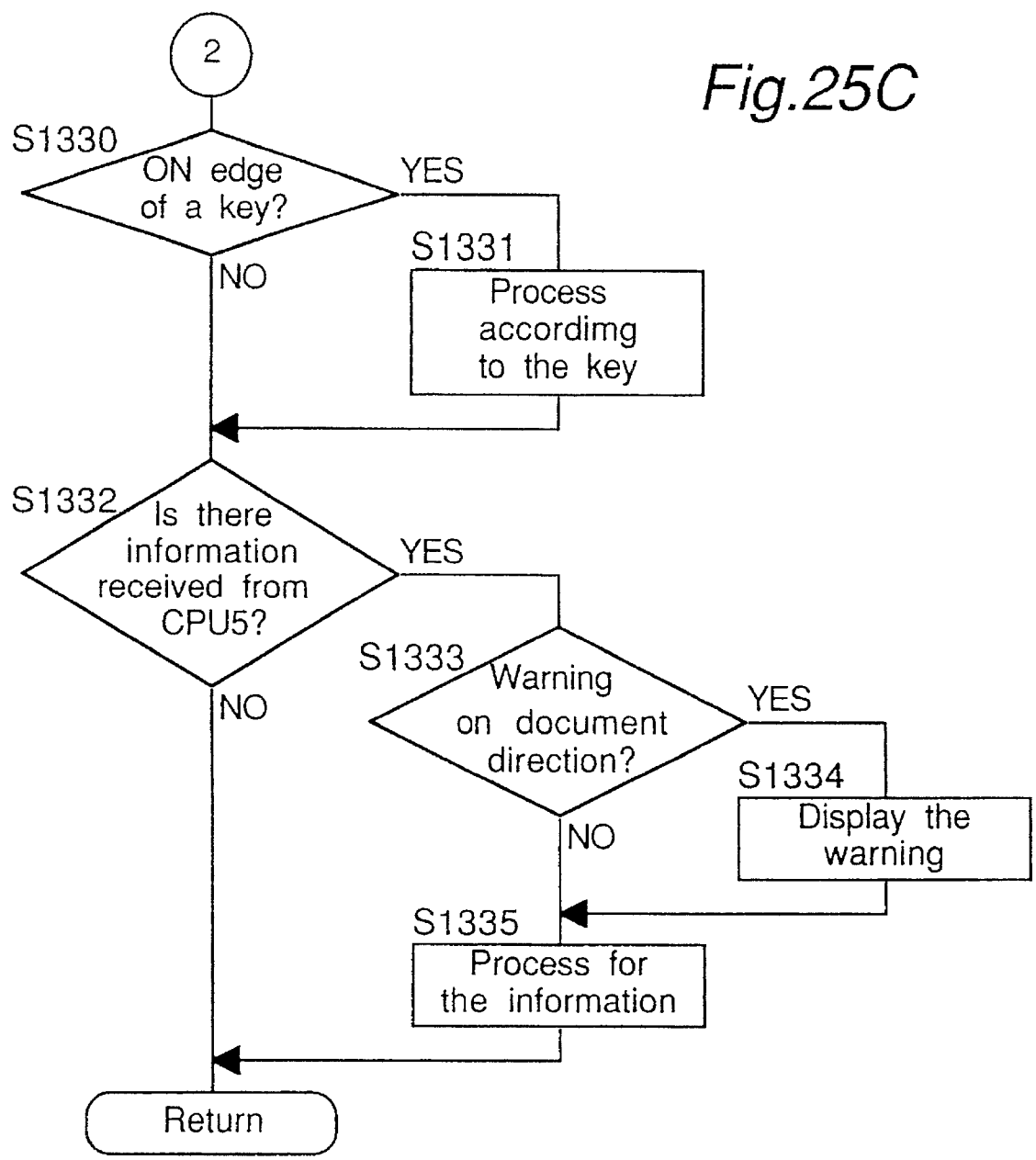

FIGS. 25A, 25B and 25C show a flow of the key-input control (step S1300 in FIG. 24). In this flow, displays in the touch panel 91 are changed according to a key-input by a user and signals in correspondence to the key-inputs are sent to the CPU 5. When a key-input of the document type key 100 is received (YES at step S1301), document type (single-face document or two-face document) is selected cyclicly. If single-face document mode has been set or the LED 100b is turned on (YES at step S1302), two-face document mode is set (step S1304), or the LED 100b is turned off and the LED 100a is turned on. On the other hand, if single-face document mode has not been set or the LED 100a is turned on (NO at step S1302), single-face document mode is set (step S1303), or the LED 100a is turned off and the LED 100b is turned on. Then, the mode change is transmitted to the CPU 5 (step S1305).

When a key-input of the document direction key 103 is received (YES at step S1306), document direction (portrait or landscape) is selected cyclically. If a document direction has not been set or the LEDs 103a and 103b are turned off (YES at step S1307), portrait direction is set (step S1308), or the LED 103b is turned on. On the other hand, if portrait direction has been set or the LED 103a is turned on (YES at step S1309), landscape direction is set (step S1311), or the LED 103a is turned off and the LED 103b is turned on. Further, if landscape direction has been set or the LED 103b is turned on (NO at step S1309), document direction is not set (step S1310), or the LEDs 103a and 103b are turned off. Then, the direction change is transmitted to the CPU 5 (step S1312).

When a key-input of the copy key 101 is received (YES at step S1313), copy mode (single-face copy mode or two-face copy mode) is changed cyclicly. If single-face copy mode has been set or the LED 101b is turned on (YES at step S1314), two-face copy mode is set (step S1316), or the LED 101b is turned off and the LED 101a is turned on. On the other hand, if single-face copy mode has not been set or the LED 101a is turned on (NO at step S1314), single-face copy mode is set (step S1315), or the LED 101a is turned off and the LED 101b is turned on. Then, the copy mode change is transmitted to the CPU 5 (step S1317).

When a key-input of the 2-in-1 key 102 is received (YES at step S1318), 2-in-1 mode or 1-in-1 mode is selected cyclicly. If 1-in-1 mode has been set or the LED 102a is turned on (YES at step S1319), 2-in-1 mode is set (step S1321), or the LED 102a is turned off and the LED 102b is turned on. On the other hand, if 1-in-1 mode has not been set or the LED 102b is turned on (NO at step S1319), 1-in-1 mode is set (step S1320), or the LED 102b is turned off and the LED 102a is turned on. Then, the copy mode change is transmitted to the CPU 5 (step S1322).

When a key-input of the margin key 97 is received (YES at step S1323), margin position is selected cyclically. If a margin position has not been set or the LEDs 97a and 97b are turned off (YES at step S1324), left side of document is set for margin (step S1328), or the LED 97b is turned on. On the other hand, if the margin position has been set (NO at step S1324), it is decided next if left side of document has been set or not (step S1325). If left side of document has been set or the LED 97a is turned on (YES at step S1325), top side of document is set (step S1327), or the LED 97a is turned off and the LED 97b is turned on. Further, if left side has not been set or the LED 97b is turned on (NO at step S1325), no margin is set (step S1326), or the LED 97a is turned on and the LED 97b is turned off. Then, the margin mode change is transmitted to the CPU 5 (step S1329).

When one of the other key-inputs is received (YES at step S1330), processing for the key-input is performed (step 1331).

When information is received from the CPU 5 (YES at step S1332), if it is a warning that document direction is not specified (YES at step S1333), it is requested to display the warning on the touch panel 91 (step S1334). On the other hand, if it is not the warning (NO at step S1333), a processing according to the receive information is performed (step S1335). Then, the flow returns to the main flow.

Figure 26:
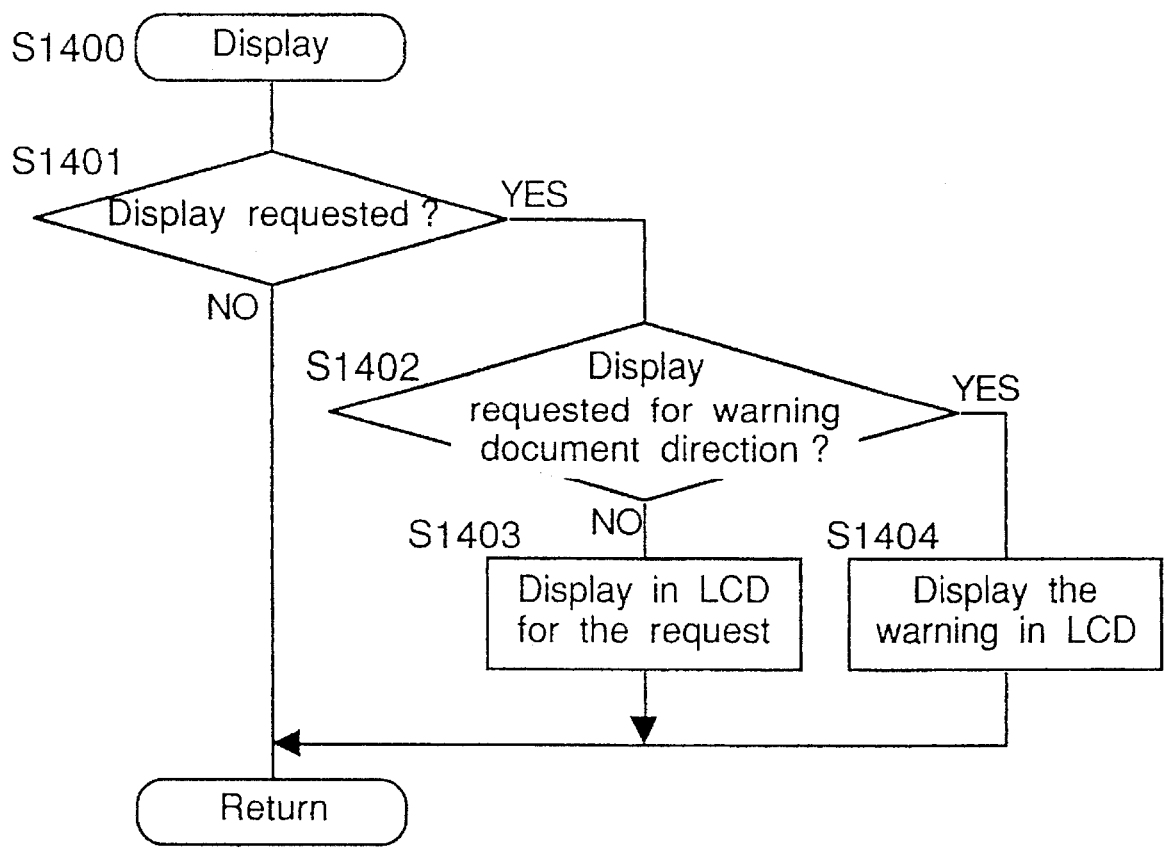
FIG. 26 is a flowchart of display control.
Figure 27:
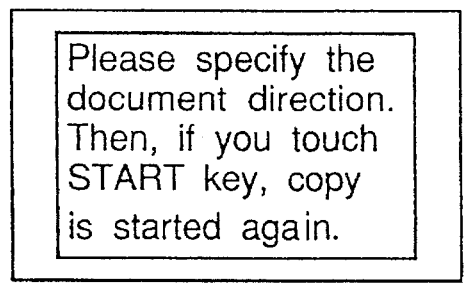
FIG. 27 is a plan view of a touch panel which displays a request.

FIG. 26 shows a flow of display control (step 1400 in FIG. 24). If it is decided that a display request is received (YES at step S1401) and if the display request is a request for displaying a warning that the document direction is not set (YES at step S1402), a display shown in FIG. 27 is displayed on the touch panel 91 in order to request to specify a document direction. Otherwise a display processing in correspondence to the receive display request is performed (step S1403). Then, the flow returns to the main flow.

Figure 28:
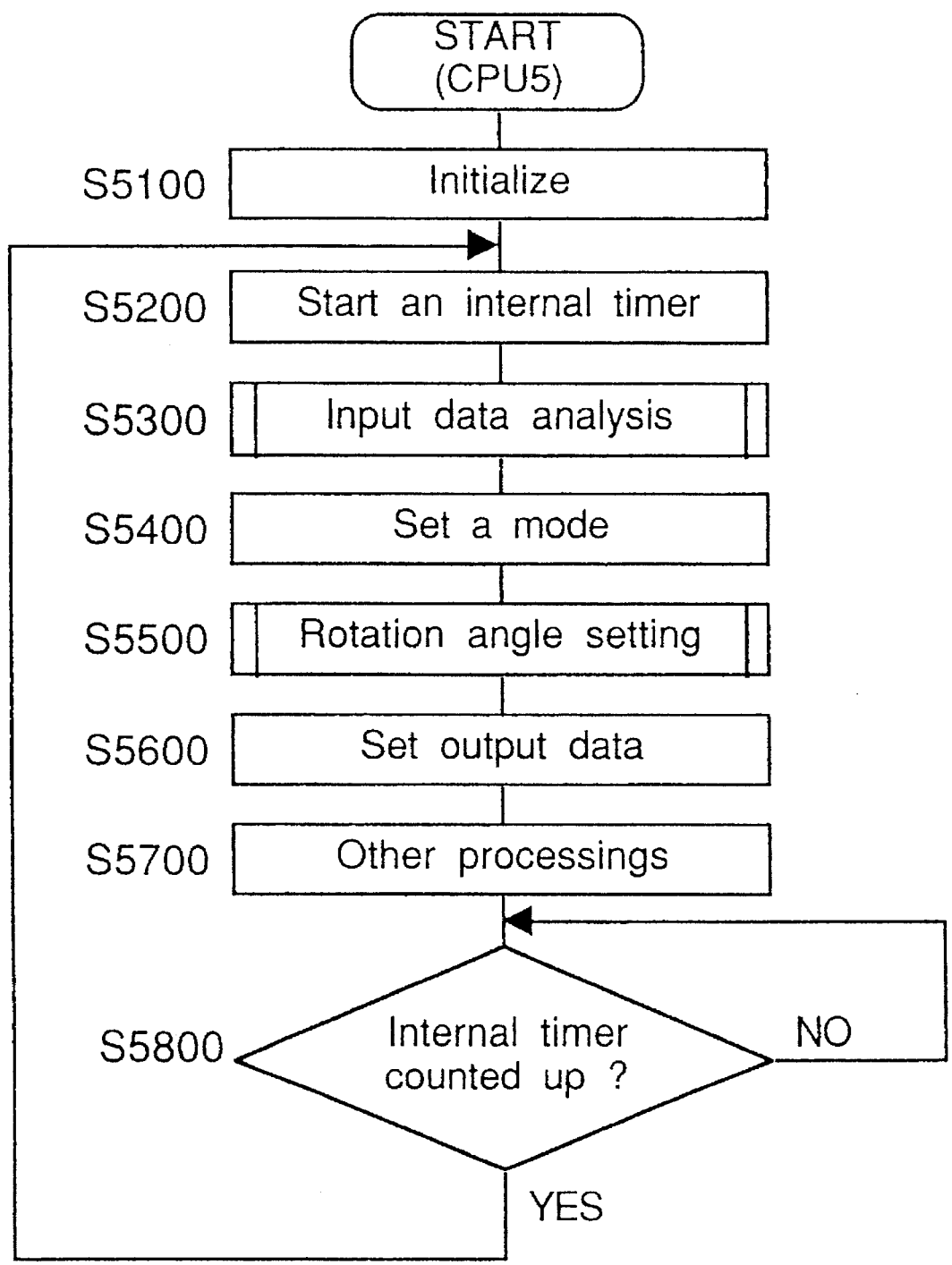
FIG. 28 is a flowchart of a main routine of CPU 5 for controlling timings between various processings.

FIG. 28 shows a flow of a main routine of CPU 5 which sends activation and deactivation commands and sets operation modes for other CPUs for controlling the timing of various sections in the copying machine. First, the CPU 5 is initialized (step S5100). Then, an internal timer is started for monitoring to keep a time needed for one routine of this flow constant (step S5200). Then, input data is analyzed (step S5300) wherein input data transmitted according to an interrupt is checked and analyzed. If a mode is changed in the input data analysis, the operation mode is set (step S5400). Then, a rotation angle is set for the image memory 304 according to the operation mode (step S5500), and the data are provided at an output area for data transmission (step S5600). Then, other processings not explained above are performed (step S5700). Then, it is waited that the timer is counted up (step 5800), and the flow returns to step S5200.

Figure 29A:
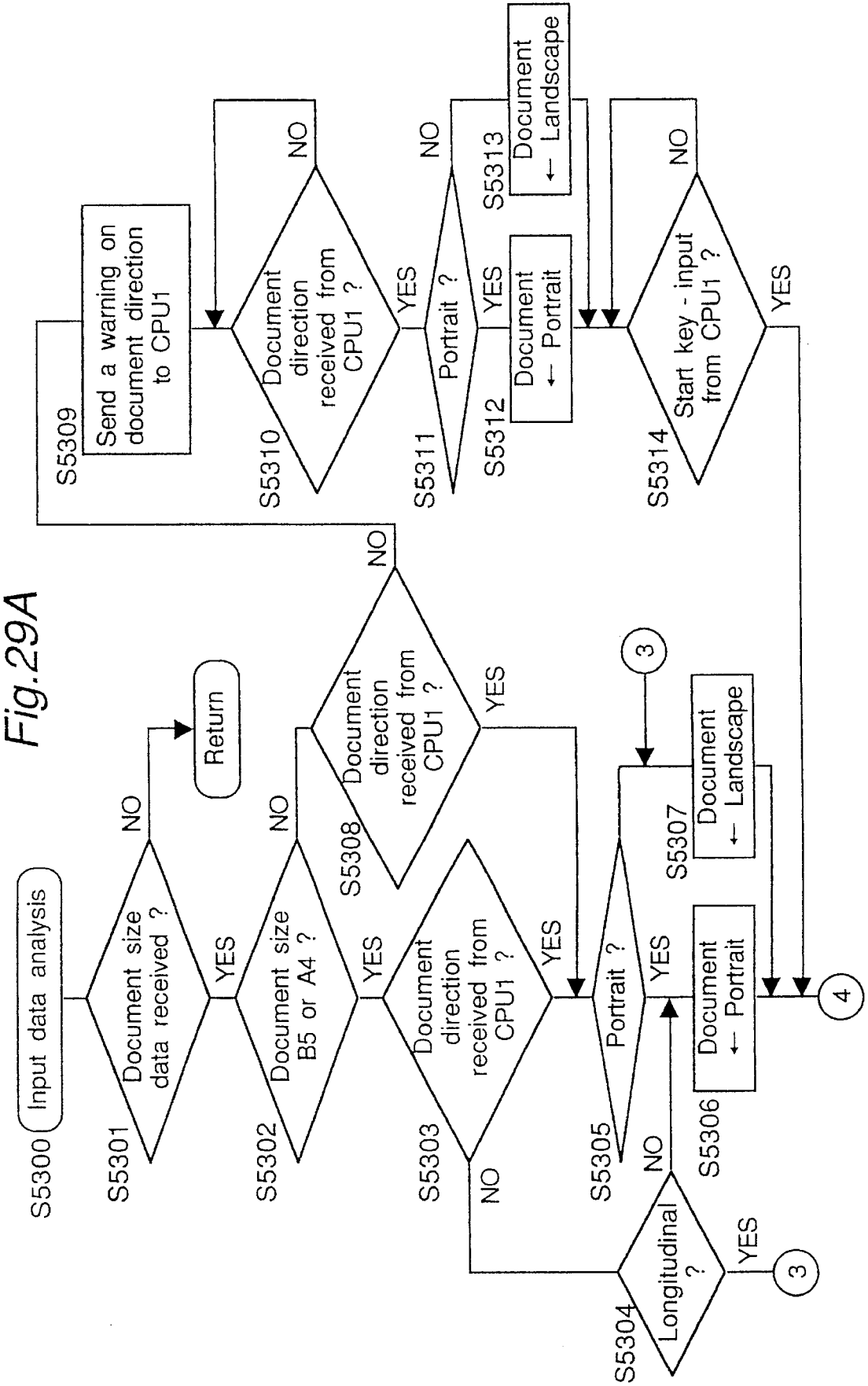
FIGS. 29A and 29B are a flowchart of input data analysis.
Figure 29B:
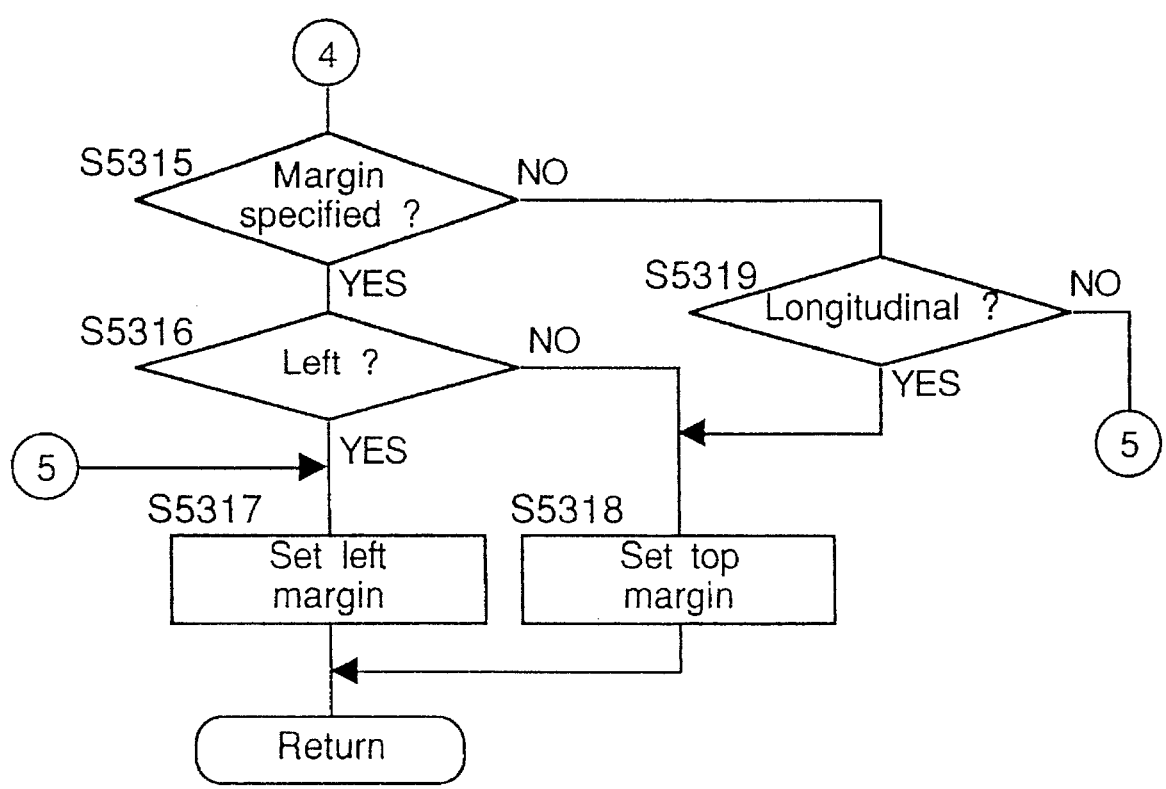

FIGS. 29A and 29B show a flow of the input data analysis (step S5300 in FIG. 28). A document size data is processed first. In the copying machine of the embodiment, B5 and A4 sizes of documents can be set on the platen 18 either longitudinally or laterally, while other sizes such as B4, A3 and A5 can be set only in lateral direction. However, needless to say, the invention is not limited to the example. If a document size data detected by the CPU 7 is decided to be received (YES at step S5301), it is decided next if the document size is either of B5 and A4 or not (step S5302). If the document size is either of B5 and A4 (YES at step S5302), if a document direction data is received from the CPU 1 (YES at step S5303), the flow proceeds to step S5305 to decide the kind of the document according to the document direction data. That is, if the document direction data is decided to be portrait (YES at step S5305), the document is set as a portrait document (step S5306), otherwise it is set as a landscape document (step S5307). If the document size data is not received (NO at step S5303), the kind of the document is determined according to the actual direction on the platen 18. That is, if the document direction is decided to be longitudinal (YES at step S5304), the document is set as a portrait document (step S5306), otherwise it is set as a landscape document (step S5307). If the document size is not either of B5 and A4 (NO at step S5302) and if a document direction data is received from the CPU 1 (YES at step S5303). Thus, if the document direction is not set by a user, it can be set automatically according to the document size. Therefore, it is not needed to set document direction for standard documents such as a portrait image formed in a longitudinal document or a landscape document formed in a lateral document. Then, the flow proceeds to step S5305 to decide the kind of the document according to the document direction data.

If the document size is decided not to be either of B5 and A4 (NO at step S5302) and if a document direction data is decided not to be received from the CPU 1 (NO at step S5303), a warning that the document direction is not determined is sent to the CPU 1 (step S5309). In the present embodiment, a document except B5 and A4 may be fed only laterally. Therefore, if a document direction has not been set for a document except B5 and A4, a warning is displayed so as to allow a user to select the document direction. After the document direction data is received from CPU 1 (YES at step S5310), the document direction is decided according to the document direction data. That is, if the document direction data is decided to be portrait (YES at step S5311), the document direction is set as a portrait document (step S5312), otherwise it is set as a landscape document (step S5313). Then, If a start key-input is received from the CPU 1 (YES at step S5314), the flow proceeds to step S5315.

Next, it is decided if a margin data is set (step S5315). If a margin is decided to be set (YES at step S5315), the margin is set according to the margin data. That is, if the margin is decided to be set at the left side (YES at step S5316), the margin is set at the left side (step S5317), otherwise the margin is set at the top side (step S5318). If a margin is decided not to be set (NO at step S5315), the margin is set according to the actual document direction. If the document direction is decided to be longitudinal (YES at step S5319), the margin is set at the top side (step S5318), otherwise the margin is set at the left side (step S5317). Though the margin is always set in the present embodiment, it is possible to modify the embodiment that no margin can also be set.

Figure 30A:
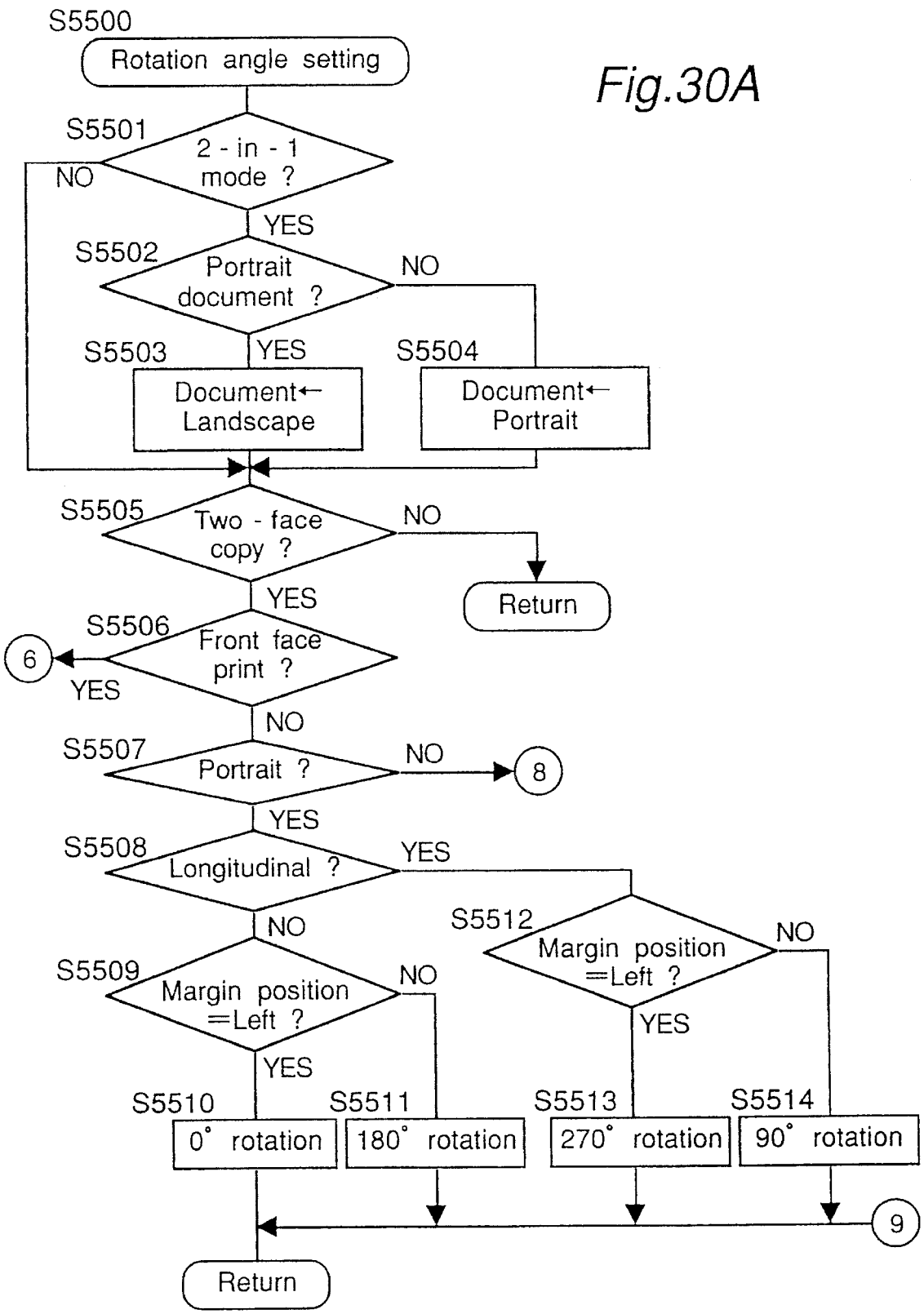
FIGS. 30A–30C show a flow of command setting in FIG. 27.
Figure 30B:
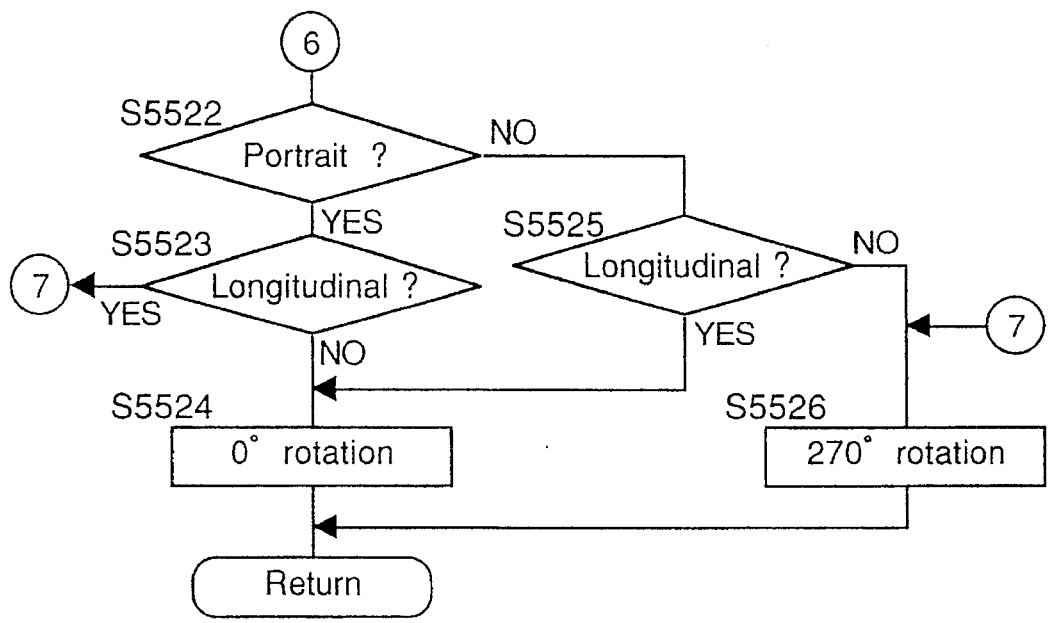
Figure 30C:
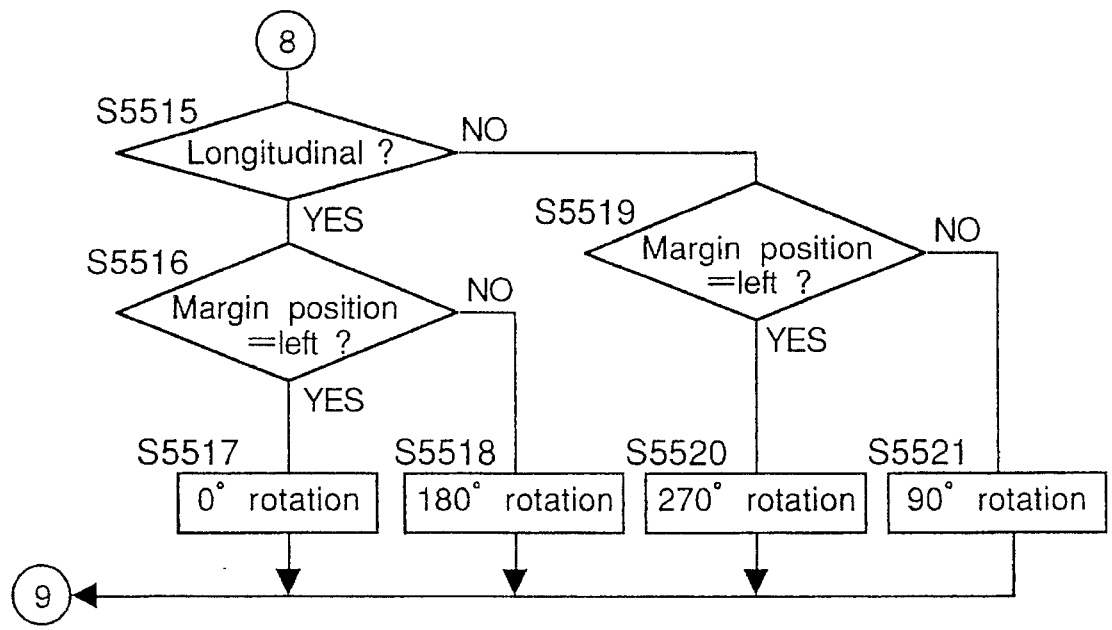

FIGS. 30A–30C show a flow for setting a rotation angle for the image memory 304 according to the operation mode (step S5500 in FIG. 28). The rotation angles for image data of front and back faces are determined by considering the document direction, the document size and the margin position, so that a user can observe normal images when copy papers bound with the margin are turned. If 2-in-1 mode is decided to be set (YES at step S5500), it is checked if the document direction is portrait or not (step S5501). In 2-in-1 mode, two images are formed in parallel longitudinally on a single face of a paper. Then, as shown in FIGS. 13A and 13B, if the document is a portrait document, the image formed actually is a landscape document, while if the document is a landscape document, the image formed actually is a portrait document. Therefore, if the document is decided to be a portrait document (YES at step S5502), the document is set as a landscape document (step S5503), otherwise the document is set as a portrait document (step S5504).

Next, it is decided if two-face copy mode is set or not (step S5506). If the two-face copy mode is decided not to be set (NO at step S5506), the flow returns to the main routine readily. If the two-face copy mode is decided to be set (YES at step S5505), an image on a front face and back face for a two-face copy mode is rotated according to settings such as document direction such as portrait or landscape, top or left margin position and a document feed direction such as longitudinal or lateral. First, it is checked if a front face is to be copied or not (step S5506). If a front face is decided to be copied (YES at step S5506), it is decided next if the document is a portrait document or not (step S5522). If the document is decided to be a portrait document (YES at step S5522), it is checked if the document is decided to be fed longitudinally or not (step S5523). If the document is decided to be fed longitudinally (YES at step S5523), the rotation angle of document image is set to be 0° or the image is not rotated (step S5524, refer FIGS. 16 and 17), otherwise it is set to be 270° (step S5526, refer FIGS. 18 and 19). If the document is decided not to be a portrait document (NO at step S5522), it is checked next if the document is fed longitudinally or not (step S5525). If the document is decided to be fed longitudinally (YES at step S5525), the rotation angle of document image is set to be 0° (step S5524, refer FIGS. 20 and 21), otherwise it is set to be 270° (step S5526, refer FIGS. 22 and 23). Then, the flow returns.

If a front face is decided not to be copied (YES at step S5507) or if a back face is decided to be copied, it is decided next if the document is a portrait document or not (step S5507). If the document is decided to be a portrait document (YES at step S5507), it is checked next if the document is decided to be fed longitudinally or not (step S5508). If the document is decided to be fed longitudinally (YES at step S5508), the rotation angle of document is set to be 0° (step S5510, refer FIG. 16) if the margin position is set decided to be set as left (YES at step S5509), while it is set to be 180° (step S5511, refer FIG. 17) if the margin position is decided not to be set as left (NO at step S5509) or if the margin position is set as top. If the document is decided not to be set longitudinally (NO at step S5508) or if the document is decided to be fed longitudinally, the rotation angle of document image is set to be 270° (step S5513, refer FIG. 18) if the margin position is set as left (YES at step S5512) while it is set to be 90° (step S5514, refer FIG. 19) if the margin position is not set as left (NO at step S5512) or if the margin position is set as top.

If the document is decided not to be a portrait document (NO at step S5507), it is checked next if the document is decided to be fed longitudinally or not (step S5515). If the document is decided to be fed longitudinally (YES at step S5515), the rotation angle of document is set to be 0° (step S5517, refer FIG. 20) if the margin position is decided to be set as left (YES at step S5516) while it is set to be 180° (step S5518, refer FIG. 21) if the margin position is not set as left (NO at step S5516) or if the margin position is set as top. If the document is decided not to be fed longitudinally (NO at step S5515) or if the document is decided to be set laterally, the rotation angle of document is set to be 270° (step S5520, refer FIG. 22) if the margin position is decided to be set as left (YES at step S5519) while it is set to be 90° (step S5521, refer FIG. 23) if the margin position is decided not to be set as left (NO at step S5519) or if the margin position is set as top.

Figure 31:
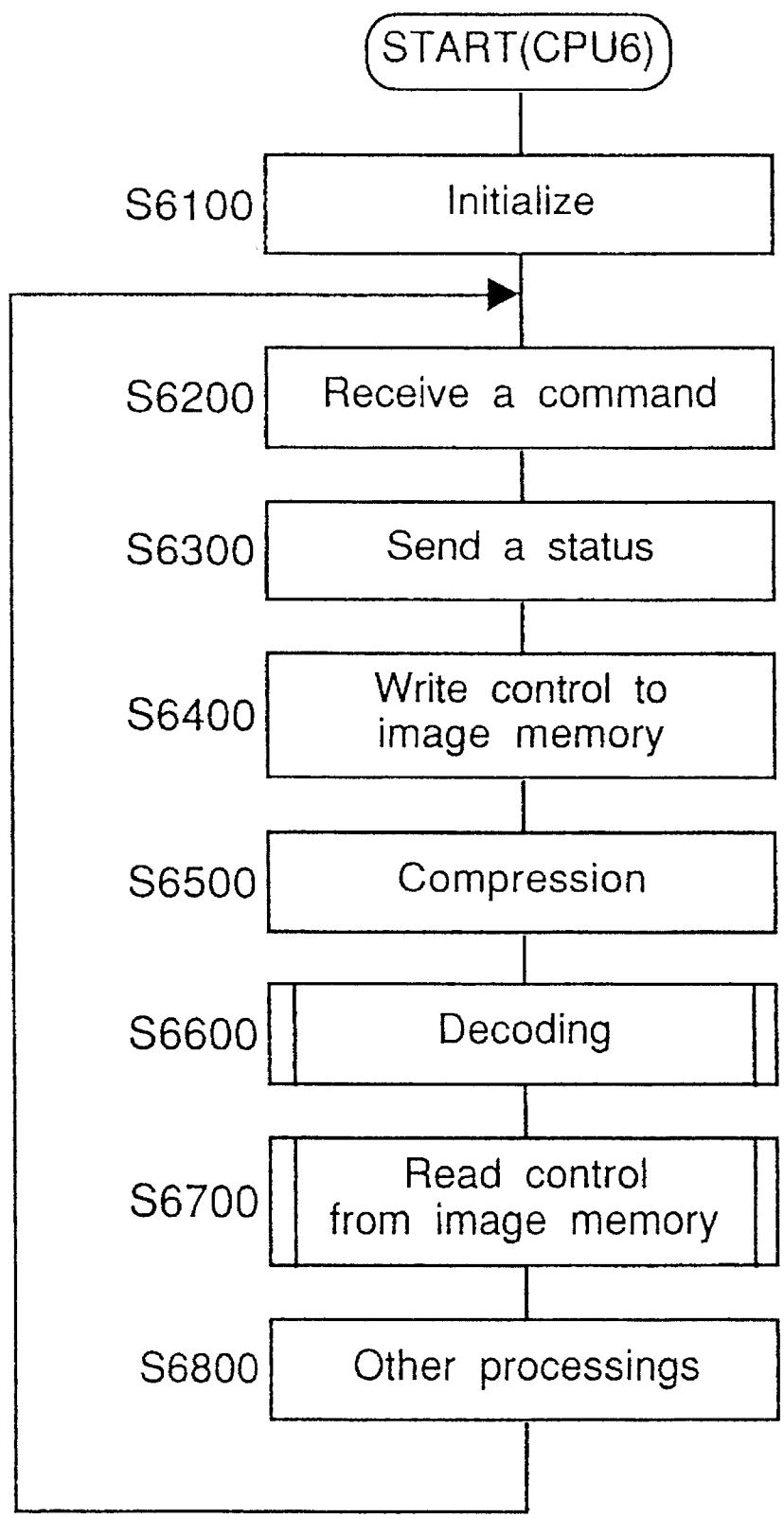
FIG. 31 is a flowchart of a main routine of CPU 6 which controls a memory unit.

The CPU 6 controls the memory unit 30 to store image data in an image memory 304 and sends them to the print processor 40. FIG. 31 shows a main flowchart of the CPU 6. After the initialization (step S6100), a command from the other CPUs is received (step S6200) and a status is transmitted to other CPUs (step S6300). Then, data are written to the image memory 304 (step S6400), and the data are compressed to be stored in the code memory 306 (step S6500). Code data in the code memory 306 is decoded to be stored in the image memory 304 (step S6600). The data in the image memory 304 are read for rotation thereof (step S6700). Then, other processings are processed (step S6800), and the flow returns to step S6200.

Figure 32:
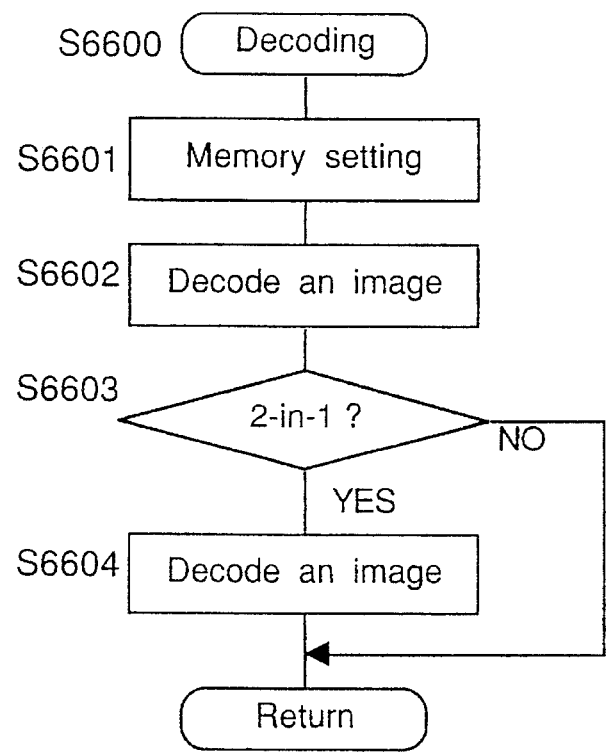
FIG. 32 is a flowchart of decoding.

FIG. 32 shows a flow of decoding control (step S6600 in FIG. 31). First, conditions such as addresses for storing decoded image data in the image memory 304 are set (step S6601). Then, a data of an image is decoded from the code memory 306 (step S6602). If 2-in-1 mode is decided to be set (YES at step S6603), two images have been stored in the code memory 306, and another image is also expanded from the code memory 306 (step S6604). Then, the flow returns.

Figure 33:
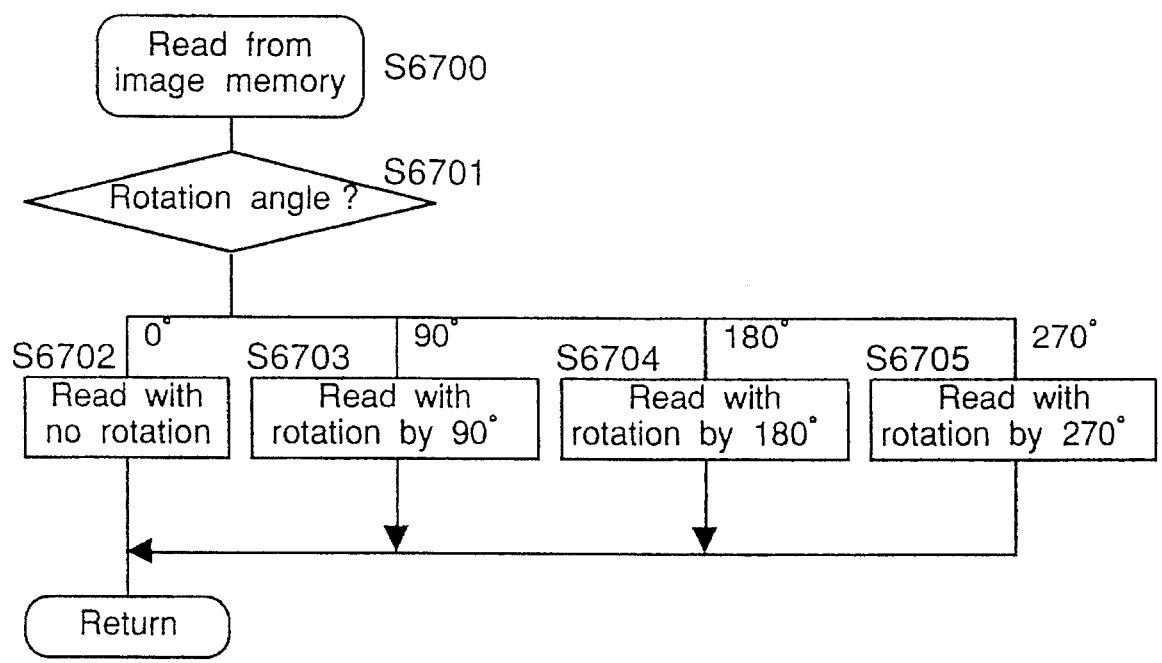
FIG. 33 is a flowchart of memory read control.

FIG. 33 shows a flow of memory read control (step S6700 in FIG. 31). The flow branches according to the rotation angle set by the CPU 5 as shown in FIGS. 30A–30C (step S6701). The rotation of an image can be performed by changing the order of reading image data stored in the image memory 304. If the rotation angle is set to be 0°, the image data are sent without no further data processing (step S6702). If the rotation angle is set to be 90°, the image data are read by rotating them by 90° (step S6703). If the rotation angle is set to be 180°, the image data are read by rotating them by 180° (step S6703). If the rotation angle is set to be 270°, the image data are read by rotating them by 270° (step S6704). Then, the flow returns to the main flow.

Figure 34:
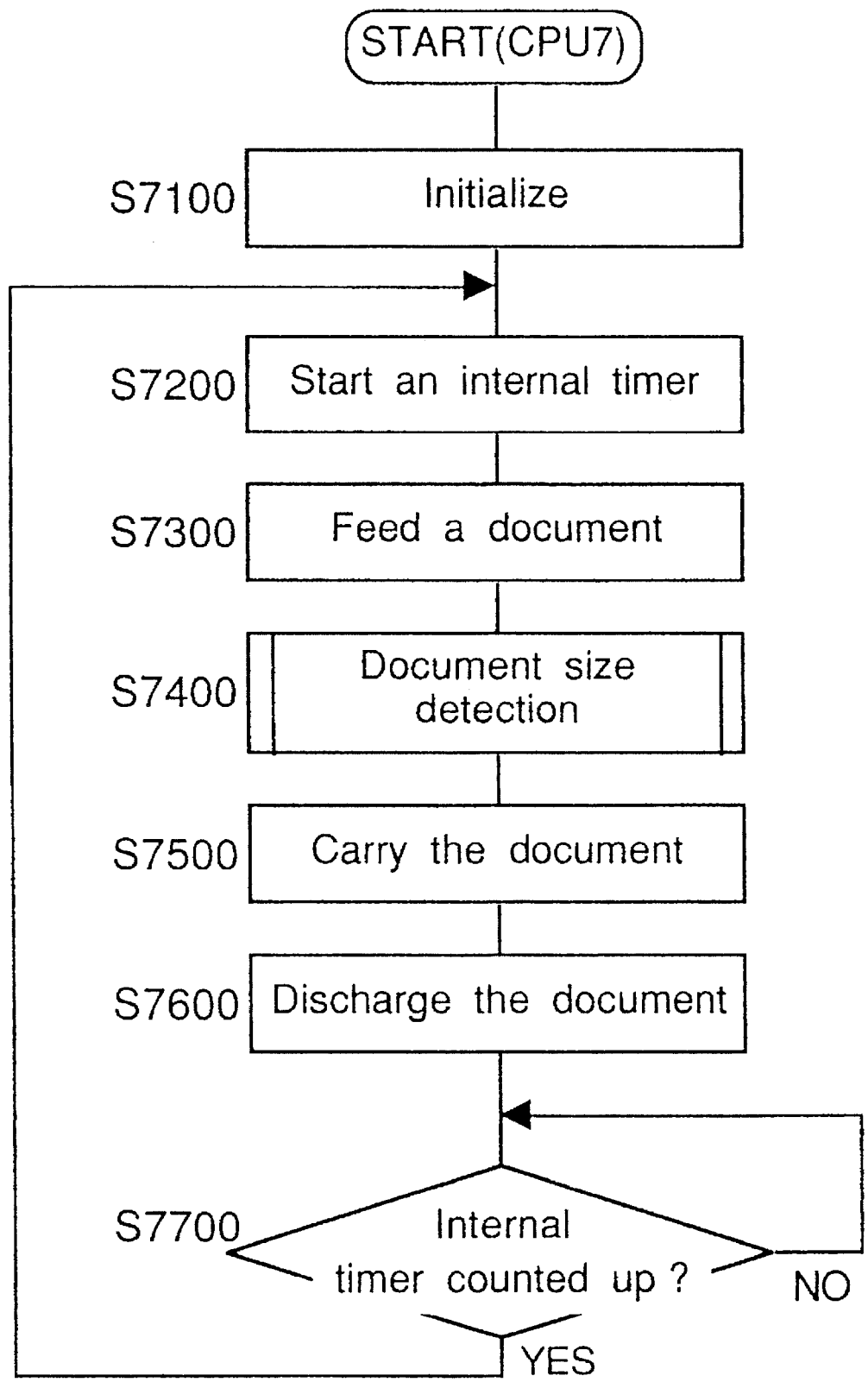
FIG. 34 is a main flowchart of the CPU 7 which controls an automatic document feeder.

FIG. 34 shows a main flow of the CPU 7 which controls the automatic document feeder 500. After initialization (step S7100), an internal timer is started for monitoring to keep a time for one routine of this flow constant (step S7200). Then, a document is fed to the belt 506 (step S7300), and a document size is detected (step S7400). Then, the document is carried by the belt 506 to a predetermined position on the platen 18 (step S7500). After the document is read, the document is carried by the reverse roller 507 to be discharged or to be carried again onto the platen 18 according to copy mode (step S7600). Then, if the internal timer is counted up (YES at step S7700), the flow returns to step S7200.

Figure 35A:
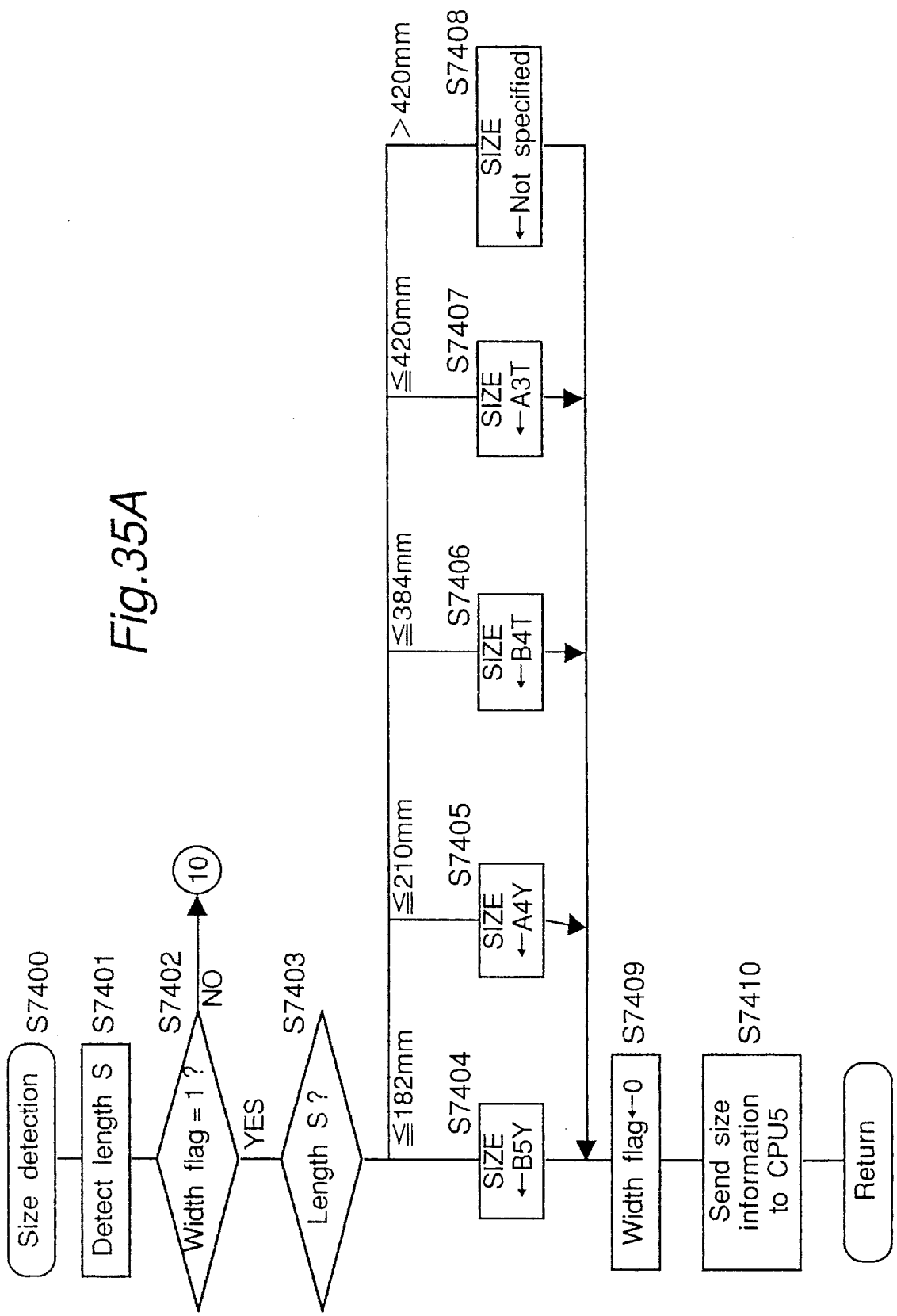
FIGS. 35A and 35B are a flowchart of size detection.
Figure 35B:
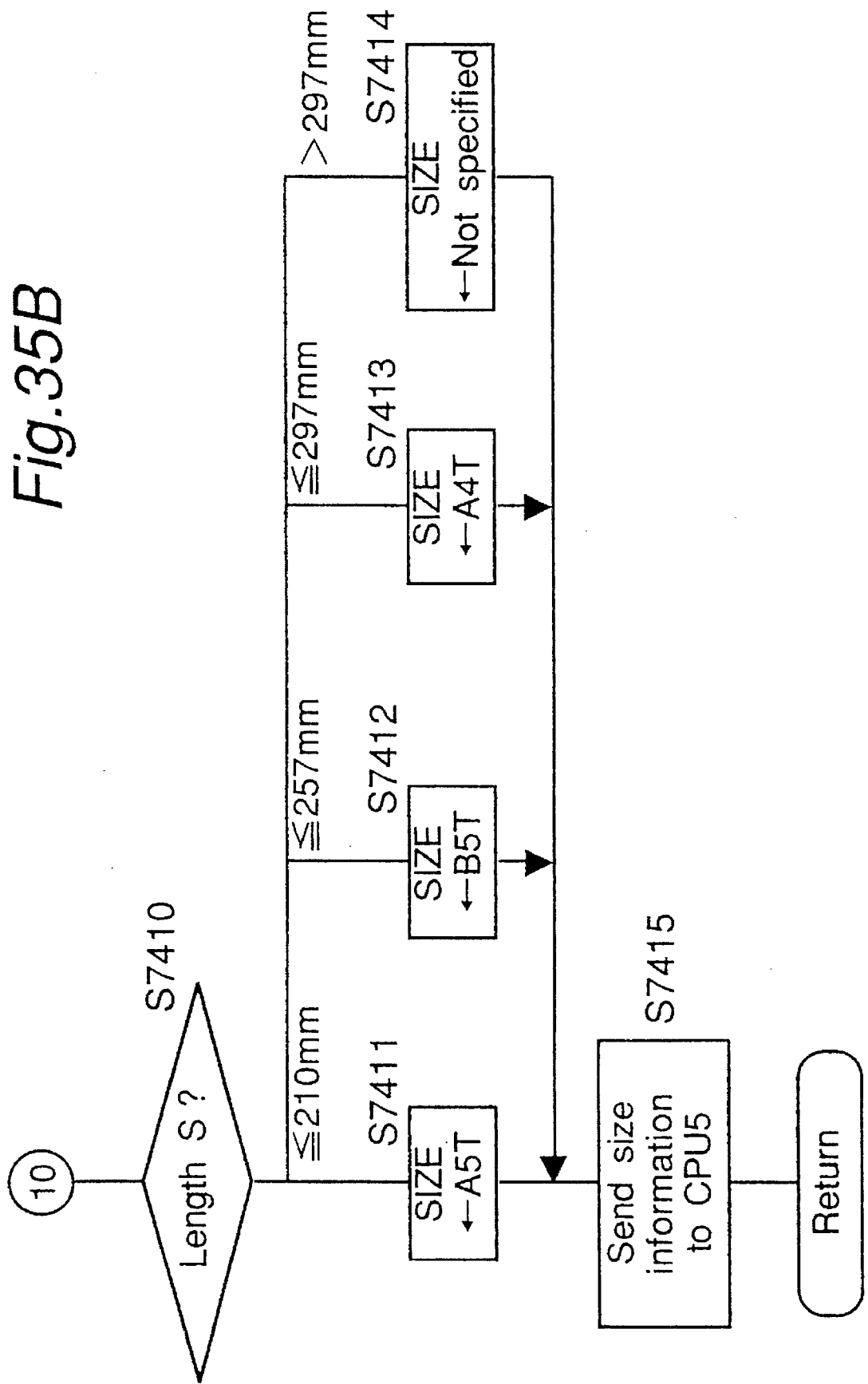

FIGS. 35A and 35B show a flow of size detection (step S7400 in FIG. 34). First, a document length S is measured with the sensors SE51 according to a time needed to feed a document over them (step S7401). The time is proportional to the document length S. Next, it is decided if the width flag is set to be "1" (step S7402). The sensors SE51 detect a document having a width larger than that of a B4 document carried laterally, and this sets the width flag as "1". The document size is determined by the length S and the width flag. In FIGS. 35A and 35B, "T" means a longitudinal direction for document feed, while "Y" means a lateral direction. If the width flag is decided to be set to be "1" (YES at step S7402), the flow branches according to length S (step S7403). That is, if the length S is 182 mm or less, the document size is determined as B5Y or B5 size fed laterally (step S7404). If the length S is above 182 mm and 210 mm or less, the document size is determined as A4Y or A4 size fed laterally (step S7405). If the length S is above 210 mm and 384 mm or less, the document size is determined as B4T or B4 size fed longitudinally (step S7406). If the length S exceeds above 384 mm and 420 mm or less, the document size is determined as A3Y or A3 size fed longitudinally (step S7407). If the length S is above 420 mm, the document size is determined not to be set (step S7408). Then, the width flag is set as "0" (step S7409), and the size data is sent to the CPU 5 (step S7401).

If the width flag is decided not to be set as "1" (NO at step S7402), the flow branches according to the document length S (step S7410). That is, if the length S is 210 mm or less, the document size is determined as A5T or A5 size fed longitudinally (step S7411). If the length S is above 210 mm and 257 mm or less, the document size is determined as B5T or B5 size fed longitudinally (step S7412). If the length S is above 257 mm and 297 mm or less, the document size is determined as A4T or A4 size fed longitudinally (step S7413). If the length S is above 297, the document size is determined not to be set (step S7414). Then, the size data is sent to the CPU 5 (step S7415).

In the above-mentioned embodiment, a longitudinal direction of a document agrees with a longitudinal direction of a copy paper. However, if they do not agree with each other, two-face copy is possible by setting an appropriate rotation angle.

Though the image data is stored in the image memory 306 by taking the margin position into account in the above-mentioned embodiment, the image data can be stored without considering the margin position if the margin can be generated by displacing the exposure timing of the laser beam onto the photoconductor drum 71 in an electrophotographic process.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image forming apparatus having a two-face copy mode wherein document images are formed on front and back faces of a paper, which apparatus comprises:

a document direction setting means for setting a direction of an image in a document;

a margin setting means for setting a first margin position for a document image on the front face in a reproduced image on a paper and for setting a second margin position for another document image on the back face in another reproduced image on the paper, said second margin position being determined as a position opposite to the first margin position such that said first and second margin positions together define a margin on said paper;

an image reader for detecting a document image and for providing digital image data thereof;

an image memory for receiving the digital image data provided by said image reader and for storing said received digital image data;

a rotation angle determination means for determining a rotation angle according to the document direction set by said document direction setting means and the first and second margin positions set by said margin setting means so that images can be observed in a normal orientation on the front and back faces of the paper if the paper is turned over by fixing it at the margin;

a reading and rotation means for reading the digital image data from said image memory and for rotating the read digital image data by the rotation angle determined by said rotation angle determination means; and an image forming means for receiving the digital image data from said reading and rotation means and for forming images on the front and back faces of the paper.

2. The image forming apparatus according to claim 1, wherein said rotation angle determination means determines a same rotation angle for the front and back faces of the paper when the document direction setting means sets that the document is a portrait document and the margin setting means sets the first and second margin positions such that the margin defined thereby is at a top end of the paper.

3. The image forming apparatus according to claim 1, wherein said rotation angle determination means determines a same rotation angle for the front and back faces of the paper when the document direction setting means sets that the document is a landscape document and the margin setting means sets the first and second margin positions such that the margin defined thereby is at a left end of the paper.

4. The image forming apparatus according to claim 1, wherein said rotation angle determination means determines rotation angles different by 180° for front and back faces of the paper when the document direction setting means sets that the document is a portrait document and the margin setting means sets the first and second margin positions such that the margin defined thereby is at a left end of the paper.

5. The image forming apparatus according to claim 1, wherein said rotation angle determination means determines rotation angles different by 180° for front and back faces of the paper when the document direction setting means sets that the document is a landscape document and the margin setting means sets the first and second margin positions such that the margin defined thereby is at a top end of the paper.

6. The image forming apparatus according to claim 1, further comprising a sensor for detecting a document size of a document, wherein said document direction setting means decides the direction of an image in a document according to the document size detected by said sensor.

7. The image forming apparatus according to claim 1, wherein said document direction setting means comprises a key operable by a user to set the direction of an image in a document.

8. The image forming apparatus according to claim 1, further comprising a sensor for detecting a document size of a document, wherein said margin setting means sets the first and second margin positions according to the document size detected by said sensor.

9. The image forming apparatus according to claim 1, wherein said margin setting means comprises a key operable by a user to set the first margin position for a document image on the front face in a reproduced image on a paper.

10. An image forming apparatus having a two-face copy mode wherein document images are formed on front and back faces of a paper and having a 2-in-1 copy mode wherein two document images are formed on a same face of a paper, which apparatus comprises:

an image reader for detecting a document image and for providing digital image data thereof;

an image memory for storing a synthesized image of digital image data of two documents provided by said image reader;

a document direction setting means for setting a direction of an image in a document;

a margin setting means for setting a first margin position for a synthesized image on the front face in a reproduced image on a paper and for setting a second margin position for another synthesized image on the back face in another reproduced image on the paper, said second margin position being determined as a position opposite to the first margin position such that said first and second margin positions together define a margin on said paper;

a rotation angle determination means for determining a rotation angle according to the document direction set by said document direction setting means and the first and second margin positions set by said margin setting means so that images can be observed in a normal orientation on the front and back faces of the paper if the paper is turned over by fixing it at the margin;

a reading and rotation means for reading the digital image data from said image memory and for rotating the read digital image data by the rotation angle determined by said rotation angle determination means; and an image forming means for receiving the digital image data from said reading and rotation means and for forming images on the front and back faces of the paper.

11. The image forming apparatus according to claim 10, wherein said rotation angle determination means determines a same rotation angle for the from and back faces of the paper when the document direction setting means sets that the document is a portrait document and the margin setting means sets the first and second margin positions such that the margin defined thereby is at a top end of the paper.

12. The image forming apparatus according to claim 10, wherein said rotation angle determination means determines a same rotation angle for front and back faces of the paper when the document direction setting means sets that the document is a landscape document and the margin setting means sets the first and second margin positions such that the margin defined thereby is at a left end of the paper.

13. The image forming apparatus according to claim 10, wherein said rotation angle determination means determines rotation angles different by 180° for front and back faces of the paper when the document direction setting means sets that the document is a portrait document and the margin setting means sets the first and second margin positions such that the margin defined thereby is at a left end of the paper.

14. The image forming apparatus according to claim 10, wherein said rotation angle determination means determines rotation angles different by 180° for from and back faces of the paper when the document direction setting means sets that the document is a landscape document and the margin setting means sets the first and second margin positions such that the margin defined thereby is at a top end of the paper.

15. The image forming apparatus according to claim 10, further comprising a sensor for detecting a document size of a document, wherein said document direction setting means decides the direction of an image in a document according to the document size detected by said sensor.

16. The image forming apparatus according to claim 10, wherein said document direction setting means comprises a key operable by a user to set the direction of an image in the document.

17. The image forming apparatus according to claim 10, further comprising a sensor for detecting a document size of a document, wherein said margin setting means sets the first and second margin positions according to the document size detected by said sensor.

18. The image forming apparatus according to claim 10, wherein said margin setting means comprises a key operable by a user to set the first margin position for a document image on the from face in a reproduced image on the paper.

* * * * *

UNITED STATES PATENT AND TRADEMARK OFFICE
CERTIFICATE OF CORRECTION

PATENT NO. : 5,530,560
DATED : June 25, 1996
INVENTOR(S) : Akio Nakajima

It is certified that error appears in the above-indentified patent and that said Letters Patent is hereby corrected as shown below:

In col. 2, line 12, before "an" delete "a".

In col. 2, line 58, delete "if".

In col. 3, line 2, change "document" to --documents--.

In col. 5, line 17, after "which", change "fixed" to --fixes--.

In col. 5, line 57, after "length" insert --of--.

In col. 18, line 21 (Claim 11, line 3), change "from" to --front--.

In col. 18, line 42 (Claim 14, line 3), change "from" to --front--.

In col. 18, last line (Claim 18, line 4), change "from" to --front--.

Signed and Sealed this

Twenty-fourth Day of September, 1996

*Attest:*

BRUCE LEHMAN

*Attesting Officer*  *Commissioner of Patents and Trademarks*